(12) United States Patent
Li et al.

(10) Patent No.: US 11,079,204 B2
(45) Date of Patent: Aug. 3, 2021

(54) INTEGRATED SHOOTING MANAGEMENT SYSTEM BASED ON STREAMING MEDIA

(71) Applicant: Huntercraft Limited, Albany, NY (US)

(72) Inventors: Danyang Li, Albany, NY (US); Ming Chen, Albany, NY (US); Yayun Gong, Albany, NY (US)

(73) Assignee: HUNTERCRAFT LIMITED, Albany, NY (US)

( * ) Notice: Subject to any disclaimer, the term of this patent is extended or adjusted under 35 U.S.C. 154(b) by 0 days.

(21) Appl. No.: 16/789,182

(22) Filed: Feb. 12, 2020

(65) Prior Publication Data

US 2020/0184681 A1 Jun. 11, 2020

Related U.S. Application Data

(63) Continuation-in-part of application No. 16/694,180, filed on Nov. 25, 2019, now abandoned, which is a continuation of application No. 15/822,698, filed on Nov. 27, 2017, now Pat. No. 10,489,932.

(51) Int. Cl.
| | |
|---|---|
| *F41J 5/14* | (2006.01) |
| *G06T 7/73* | (2017.01) |
| *F41J 5/02* | (2006.01) |
| *G06F 16/27* | (2019.01) |
| *G06T 7/194* | (2017.01) |
| *G09B 5/00* | (2006.01) |
| *G06T 7/136* | (2017.01) |
| *G06K 9/78* | (2006.01) |
| *G06K 9/62* | (2006.01) |
| *G06T 7/13* | (2017.01) |
| *F41J 1/00* | (2006.01) |
| *H04W 4/80* | (2018.01) |
| *H04N 5/232* | (2006.01) |

(52) U.S. Cl.
CPC . *F41J 5/14* (2013.01); *F41J 5/02* (2013.01); *G06F 16/27* (2019.01); *G06K 9/6267* (2013.01); *G06K 9/78* (2013.01); *G06T 7/13* (2017.01); *G06T 7/136* (2017.01); *G06T 7/194* (2017.01); *G06T 7/74* (2017.01); *G09B 5/00* (2013.01); *F41J 1/00* (2013.01); *H04N 5/23296* (2013.01); *H04W 4/80* (2018.02)

(58) Field of Classification Search
CPC ........ F41J 5/14; F41J 5/02; F41J 1/00; H04N 5/23296; H04W 4/80; G06T 7/74; G06T 7/136; G06T 7/13; G06T 7/194; G06K 9/78; G06K 9/6267; G09B 5/00; G06F 16/27

See application file for complete search history.

(56) References Cited

U.S. PATENT DOCUMENTS

| | | |
|---|---|---|
| 2005/0088915 A1 | 4/2005 | Lapin et al. |
| 2015/0332424 A1 | 11/2015 | Kane et al. |
| 2016/0146581 A1* | 5/2016 | Urban ................. F41J 1/10 273/403 |

(Continued)

*Primary Examiner* — Casey L Kretzer
(74) *Attorney, Agent, or Firm* — Novick, Kim & Lee, PLLC; Allen Xue

(57) ABSTRACT

An integrated shooting management system includes a data acquisition apparatus, an mobile terminal, an intelligent target, and a server. The integrated shooting management system collects the target paper information in real time and automatically analyzes the shooting accuracy while managing the user data.

14 Claims, 12 Drawing Sheets

(56) References Cited

U.S. PATENT DOCUMENTS

| | | |
|---|---|---|
| 2016/0298930 A1 | 10/2016 | Squire et al. |
| 2017/0059283 A1 | 3/2017 | Parrish |
| 2018/0043229 A1 | 2/2018 | Stemle |
| 2018/0353864 A1* | 12/2018 | Valdez .................... F41J 5/10 |
| 2019/0063884 A1 | 2/2019 | McBride et al. |

* cited by examiner

INTEGRATED SHOOTING MANAGEMENT SYSTEM BASED ON STREAMING MEDIA

TECHNICAL FIELD

The present invention mainly belongs to the technical field of streaming media, image identification and a data information integrated management system, and particularly relates to an integrated shooting management system based on streaming media.

BACKGROUND

A management process of a traditional shooting training site sequentially includes user shooting, target paper taking, target paper replacing and score statistics registration; performing statistics on shooting accuracies of users is achieved by means of the most original manual registration manner, each shooting score is recorded in a paper text form, and such a text recording manner is relatively long in recording time, low in retrieving speed and is not conducive to statistic analysis; with the popularization of a computer, scores are recorded and managed by employing a computer manner in a shooting training site, such a manner is greatly improved in terms of the efficiency relative to a traditional paper text manner, but always prevents from recording data manually by using the computer; and meanwhile, such a manner still has no change in manual operation from the management, may not perform real time analytic statistics, may not replace a target paper in time for the next round of shooting training, resulting in no conversation of the time of the user while increasing the workload of the operation and management personnel, and still bringing great inconvenience to a shooting experience.

In a shooting range, the shooting place is at a certain distance from the target, and the shooting result can't be directly seen by human eyes after shooting. In order to observe the shooting result and quickly accomplish statistics of the result data, a data acquisition apparatus that can acquire the shooting result in a long distance and analyze the shooting result can solve the above problem under that condition. The data acquisition apparatus projects the target image (target paper) under the optical imaging principle, a built-in photoelectric conversion unit converts the optical data into computable electronic data to analyze and calculate a shooting result, the data acquisition apparatus is linked with a mobile terminal and a high-definition display screen to display the image data and the analysis result in real time; in addition, the data acquisition apparatus is linked with a server to upload the shooting result data to the server for storage and further analysis and processing.

The server and the intelligent target are linked through a network, thus the shooting target paper can be remotely replaced through server operation after shooting is finished, without waiting for centralized replacement of the target paper, so that the next round of shooting training can be conveniently and quickly carried out, and the time is saved.

In the traditional shooting, only the shooters and a small number of people on the shooting site are involved directly or indirectly. In that mode, an expected effect can't be achieved for people who want to observe or communicate in real time. In the era of mobile Internet, a shooting mode capable of realizing real time streaming media interaction can solve the problem that real time observation and real time interaction can't be realized. The data acquisition apparatus acquires a real time video stream, uploads the video stream to the server via a WiFi module or a 4G/5G module in the apparatus. The data acquisition apparatus has a built-in positioning module. The server displays the current online shooting point on a map in real time. Regardless of where the user is located, the user only has to connect to the server via a mobile client or PC client, select the shooting point to watch, and enter the shooting point, the server will push a real time video stream to play. The client can interact with other users by text or voice input while watching in real time, thus the user can participate in multi-person watching and real time interaction of shooting remotely.

In traditional shooting, to have a shooting competition, the persons of interest can only invite friends or people in a small social circle in private and choose the time and place to compete; in the era of Internet, with an integrated shooting management system based on streaming media, a competition can be organized online, the news of the competition can be pushed to the users, and a large-scale shooting competition can be organized and held by means of online application and registration of users. The users only have to register with a client, select the place to participate in the competition and go to the competition place at the agreed time. The system automatically manages the entire competition process, notification, competition result evaluation and rewarding.

Content of the Invention

In view of the above problems, the present invention provides an integrated shooting management system based on streaming media that doesn't require manual intervention, starting from the application scenario of shooting management process and an idea of making shooting more interesting, and combining the research results in image science and image processing with wireless communication and data management techniques. The system comprises a data acquisition apparatus, a mobile terminal, a server, an intelligent target, and a video projection display screen, a score release display screen, a PC terminal, a data printer and network equipment required for connecting the parts of the system in order to enrich and enhance the use experience of the system. The management system collects the target paper information in real time and automatically analyzes the shooting accuracy, while managing the user data.

The object of the present invention is attained with the following technical scheme:

An integrated shooting management system based on streaming media, comprising a data acquisition apparatus, a mobile terminal, an intelligent target and a server, wherein the mobile terminal is connected with the data acquisition apparatus and/or the server and is used for watching a video stream uploaded by the data acquisition apparatus in real time, the mobile terminal can control the data acquisition apparatus to carry out video recording and photographing operations, download video and photograph data stored in the data acquisition apparatus, watch the real time video stream of the data acquisition apparatus pushed by the server, and publish interactive contents such as voice and text to realize a live broadcast effect; besides, the mobile terminal can access the server to view shooting accuracy, score, regional ranking, and perform relevant operations such as competition registration and the like;

the data acquisition apparatus is configured to acquire real time images, take photographs, record videos, and store the photographs and videos, and includes an automatic analysis module, which can automatically analyze impact points in the target paper image acquired from the target to obtain shooting accuracy; the data acquisition apparatus may be connected with the server and the mobile terminal;

the intelligent target is connected with the server, and can replace the target paper automatically according to an instruction from the server;

the server comprises a data server and a streaming media server, wherein the data server manages shooting data, basic data and competition data, and also carries out instruction interaction with the data acquisition apparatus, the intelligent target and the mobile terminal; the streaming media server manages photographs, videos and real time video streams, and cooperates with the data server to respond to user operations;

the mobile terminal controls data exchange with the data acquisition apparatus and/or the server, and invoke and display the photographs, the video records and the shooting accuracies.

Further, wherein the automatic analysis module is configured to convert an optical image captured by the data acquisition apparatus into an electronic image, extract a target paper area from the electronic image, perform pixel-level subtraction on the target paper area and an electronic reference target paper to detect points of impact, calculate a center point of each of the points of impact, and determine the shooting accuracies (scores) according to a deviation between the center point of each of the points of impact and a center point of the target paper area;

the electronic reference target paper is an electronic image of a blank target paper or a target paper area extracted in historical analysis;

the deviation comprises a longitudinal deviation and a lateral deviation.

Further, wherein the mobile terminal is connected with the data acquisition apparatus as follows: the data acquisition apparatus serves as a wireless WiFi hotspot and the mobile terminal serves as a client to access a WiFi hotspot network, so that a connection between the mobile terminal and the data acquisition apparatus is achieved, and the mobile terminal obtains the photographs acquired by the data acquisition apparatus, raw data of the video records and the shooting accuracies obtained by the data acquisition apparatus;

a transmission distance between the data acquisition apparatus and the mobile terminal is controlled within 100 meters;

the mobile terminal displays information of the target paper image acquired by the data acquisition apparatus in real time, controls startup and shutdown of acquisition of the data acquisition apparatus, controls startup of the automatic analysis module of the data acquisition apparatus, and controls startup and shutdown of the WiFi hotspot.

Further, wherein the mobile terminal is connected with the server as follows: the mobile terminal and the server are in the same wireless network to implement the connection between the mobile terminal and the server;

after the mobile terminal has been verified, the shooting accuracies, the photographs and the video records local to the mobile terminal can be transmitted to the server.

Further, wherein the mobile terminal, the data acquisition apparatus and the server are interconnected particularly as follows:

1) the mobile terminal notifies the data acquisition apparatus of information of a network to be accessed via Bluetooth or WiFi;

2) after receiving instruction data, the data acquisition apparatus analyzes the instruction data to obtain a name, a user name and a password of the network to be accessed;

3) the data acquisition apparatus performs a network access function and feeds a network connection result back to the mobile terminal via Bluetooth or WiFi;

4) the mobile terminal analyzes and determines whether the data acquisition apparatus is successfully accessed or not, and if the data acquisition apparatus is successfully accessed, the mobile terminal, the data acquisition apparatus and the server are interconnected.

Further, wherein the target is an intelligent target, and the server remotely controls the intelligent target to replace a target paper through a network;

intelligent target comprises an exterior structure, wherein the exterior structure internally comprises a target paper recovery compartment, a target paper rotary shaft, drive shafts, a target paper area, a new target paper compartment, a motor servo mechanism, a CPU processing unit and a wireless WiFi unit;

the CPU processing unit receives an instruction of the server through the wireless WiFi unit, the CPU processing unit processes information of the instruction of the server and controls an execution action of the motor servo mechanism, and the motor servo mechanism is connected with the target paper rotary shaft through the drive shafts, the motor servo mechanism drives the drive shafts and the target paper rotary shaft to rotate to realize replacement of the target paper among the new target paper compartment, the target paper area and the target paper recovery compartment.

Further, wherein the server manages the shooting accuracies, the photographs and the video records, respectively;

the server classifies and manages the photographs and the video records in accordance with the uploaded users as a basic unit;

the server performs data query statistics on the shooting accuracies in accordance with time, user and group conditions, and calculates a trend curve diagram under such conditions.

Further, performing perspective correction on the target paper area to correct an outer contour of the target paper area to a circular contour after the target paper area is extracted by the automatic analysis module, and point of impact detection is performed by using the target paper area subjected to perspective correction. The perspective correction is to detect 4 key points and use the 4 key points to perform 8-DOF perspective correction.

Further, extracting a target paper area from the electronic image particularly comprises: performing large-scale mean filtering on the electronic image to eliminate grid interference on the target paper; segmenting the electronic image into a background and a foreground by using an adaptive Otsu threshold segmentation method according to a gray property of the electronic image; and determining a minimum contour by adopting a vector tracing method and a geometric feature of a Freeman link code according to the image segmented into the foreground and background to obtain the target paper area.

Further, performing pixel-level subtraction on the target paper area and an electronic reference target paper to detect points of impact particularly comprises: performing pixel-level subtraction on the target paper area and an electronic reference target paper to obtain a pixel difference image of the target paper area and the electronic reference target paper;

a pixel difference threshold of images of a previous frame and a following frame is set in the pixel difference image, and a setting result is 255 when a pixel difference exceeds the threshold, and the setting result is 0 when the pixel difference is lower than the threshold;

the pixel difference image is subjected to contour tracing to obtain a point of impact contour and a center of the contour is calculated to obtain a center point of each of the points of impact.

Further, the perspective correction particularly comprises: obtaining an edge of the target paper area by using a Canny operator, performing maximum elliptical contour fitting on the edge by using Hough transform to obtain a maximum elliptical equation, and performing straight line fitting of cross lines on the edge by using the Hough transform to obtain points of intersection with an uppermost point, a lowermost point, a rightmost point and a leftmost point of a largest circular contour, and combining the uppermost point, the lowermost point, the rightmost point and the leftmost point of the largest circular contour with four points at the same positions in a perspective transformation template to obtain a perspective transformation matrix by calculation, and performing perspective transformation on the target paper area by using the perspective transformation matrix.

Further, wherein the management system further comprises an image projection display screen, a score publishing display screen, a PC terminal, a data printer, and a network device;

the network device comprises a wired router, a wireless router, a switch and a repeater;

the video projection display screen is directly interconnected with an acquisition host through an HDMI and an AV interface, and the screen only displays projection information;

the interface of the score publishing display screen is a network or the HDMI or the AV interface, the score publishing display screen is directly connected with the server through a network interface or with a PC terminal through the HDMI or the AV interface, the server publishes and displays current real time shooting accuracy ranking data on the score publishing display screen;

the data printer is connected with the server by employing a network, a parallel port and a USB interface for data printing;

the PC terminal is connected with the data printer and the score publishing display screen to control the printing of the data printer and the displaying of the score publishing display screen.

Further, wherein the data acquisition apparatus comprises an exterior structure, wherein the exterior structure is a detachable structure as a whole, and the exterior structure internally comprises a field of view acquisition unit, an electric zooming assembly, an electro-optical conversion circuit, a CPU processing unit and an automatic analysis module;

the field of view acquisition unit comprises an objective lens combination or other optical visual device; the objective lens combination or other optical visual device is mounted on the front end of the field of view acquisition unit to obtain field of view information;

the electro-optical conversion circuit is configured to convert the field of view information into electronic information that can be displayed by the electronic unit;

the CPU processing unit is connected with the electro-optical conversion circuit and configured to process the electronic information;

the automatic analysis module is configured to analyze the electronic information to obtain shooting accuracies;

the electric zooming assembly is configured to change a focal length of the objective lens combination or other optical visual device;

the CPU processing unit is connected with the electric zooming assembly, and the CPU processing unit sends a control instruction to the electric zooming assembly for controlling the zooming.

The present invention has advantageous effects as follows:

the integrated shooting management system based on streaming media of the present invention may realize the following functions:

(1) point of impacts of shooting are automatically recognized and scores are counted;

(2) the shooting accuracies are automatically matched with shooters, and the scores may be queried;

(3) individual single-gun scores and single-score ranking are achieved, and a single score is based on data submitted after each shooting;

(4) score ranking information is published by a large screen in real time;

(5) a live shooting process image may be connected to a large screen for being displayed;

(6) statistical analysis in a team manner is achieved, such as a group manner, and the total score comparison between teams is achieved;

(7) a score and team score trend analysis for a single person and a team is achieved and scores are displayed in a chart manner;

(8) data printing is achieved, and the data includes text data and trend data;

(9) remote control of replacing the target paper is achieved, without manual site replacement.

Figure 1:
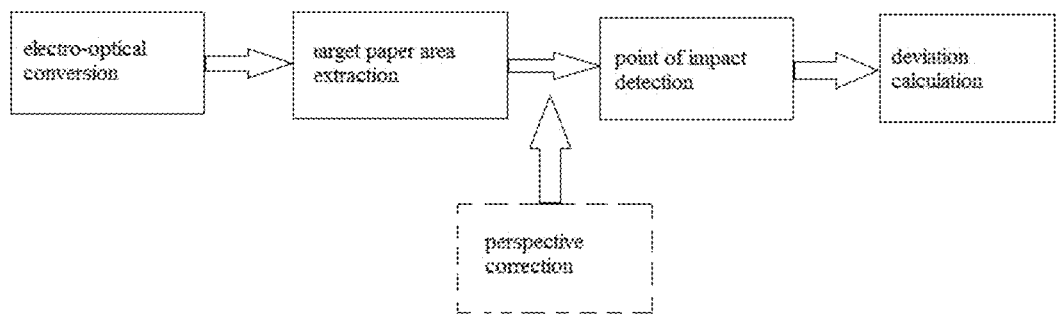
FIG. 1 is a block diagram of a flow of an analysis method according to the present invention.

wherein 1. field of view acquisition unit; 2. external leather track; 3. external key; 4. line transmission interface antenna; 5. Bluetooth excuse antenna; 6. tripod interface; 7. battery compartment; 8. electro-optical conversion board; 9. CPU core board; 10. interface board; 11. function operation board; 12. electric zooming assembly; 13. battery pack; 14. rotary encoder; 15. focusing knob/focusing handwheel; 16. 4G/5G interface antenna; 17. GPS transmission interface antenna; 18. screen switching board; 19. display screen; 20. target paper recovery compartment; 21. target paper rotary shaft; 22. currently-used target paper area; 23. first drive shaft; 24. second drive shaft; 25. new target paper compartment; 26. motor servo mechanism; 27. CPU processing unit; 28. wireless WiFi unit; 29. battery compartment; 30. power management unit; 31. external power interface; 32. transmission antenna.

DETAILED DESCRIPTION

Objectives, technical solutions and advantages of the present invention will become more apparent from the following detailed description of the present invention when taken in conjunction with accompanying drawings. It should be understood that specific embodiments described herein are merely illustrative of the present invention and are not intended to limit the present invention.

Rather, the present invention encompasses any alternatives, modifications, equivalents, and solutions made within the spirit and scope of the present invention as defined by the claims. Further, in order to give the public a better understanding of the present invention, some specific details are described below in detail in the following detailed description of the present invention. It will be appreciated by those skilled in the art that the present invention may be understood without reference to the details.

In order to observe the shooting result and quickly accomplish statistics of the result data, a data acquisition apparatus that can acquire the shooting result in a long distance and analyze the shooting result can solve the above problem under that condition. The data acquisition apparatus projects the target image (target paper) under the optical imaging principle, a built-in photoelectric conversion unit converts the optical data into computable electronic data to analyze and calculate a shooting result, the data acquisition apparatus is linked with a mobile terminal and a high-definition display screen to display the image data and the analysis result in real time; in addition, the data acquisition apparatus is linked with a server to upload the shooting result data to the server for storage and further analysis and processing.

The server and the intelligent target are linked through a network, thus the shooting target paper can be remotely replaced through server operation after shooting is finished, without waiting for centralized replacement of the target paper, so that the next round of shooting training can be conveniently and quickly carried out, and the time is saved.

In the era of mobile Internet, a shooting mode capable of realizing real time streaming media interaction can solve the problem that real time observation and real time interaction can't be realized. The data acquisition apparatus acquires a real time video stream, uploads the video stream to the server via a WiFi module or a 4G/5G module in the device. The data acquisition apparatus has a built-in positioning module. The server displays the current online shooting point on a map in real time. Regardless of where the user is located, the user only has to connect to the server via a mobile client or PC client, select the shooting point to watch, and enter the shooting point, the server will push a real time video stream to play. The client can interact with other users by text or voice input while watching in real time, thus the user can participate in multi-person watching and real time interaction of shooting remotely.

In the era of Internet, with an integrated shooting management system based on streaming media, a competition can be organized online, the news of the competition can be pushed to the users, and a large-scale shooting competition can be organized and held by means of online application and registration of users. The users only have to register with a client, select the place to participate in the competition and go to the competition place at the agreed time. The system automatically manages the entire competition process, notification, competition result evaluation and rewarding.

Example 1

Figure 13:
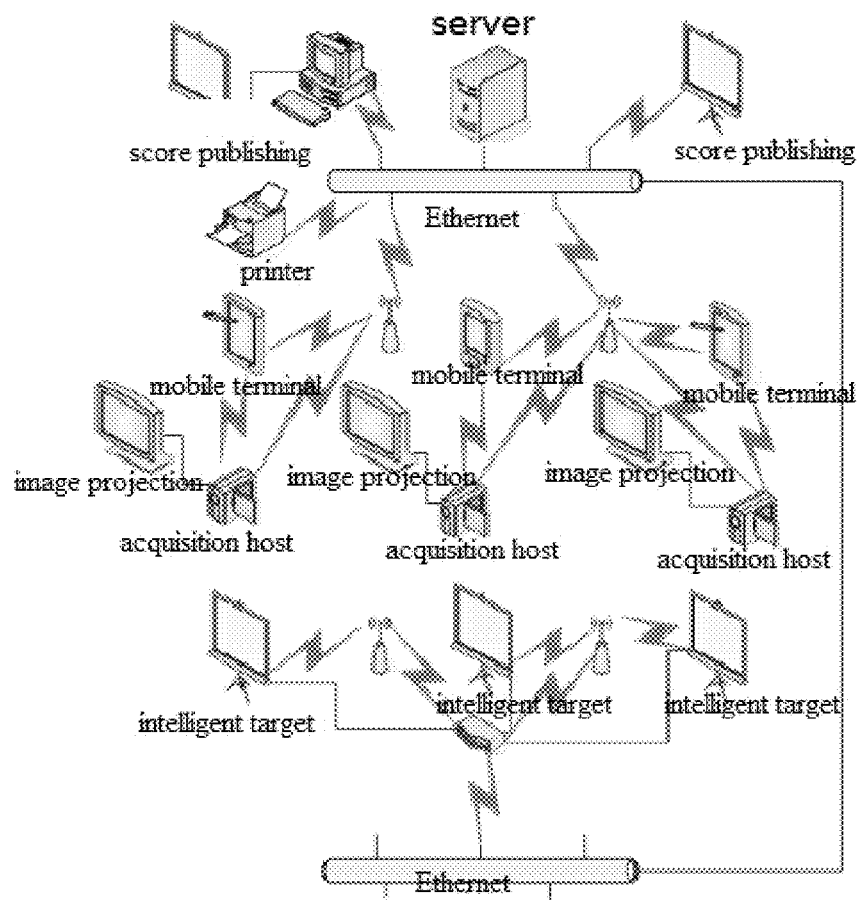
FIG. 13 is a schematic diagram showing functions of the data acquisition apparatus in an embodiment 1 according to the present invention.

As shown in FIG. 13, an integrated shooting management system based on streaming media is provided. The system comprises a data acquisition apparatus, a mobile terminal, an intelligent target and a server, wherein the mobile terminal may be connected with the data acquisition apparatus, can be used to watch a video stream uploaded by the data acquisition apparatus in real time, can control the data acquisition apparatus to carry out video recording and photographing operations, and can also download video and photograph data stored in the data acquisition apparatus; the mobile terminal can also establish a connection with the server to watch the real time video stream of the data acquisition apparatus pushed by the server and publish interactive content such as voice and text to realize a live broadcast effect; in addition, the mobile terminal can access the server to view shooting accuracy, score, and regional ranking, and perform relevant operations such as competition registration and the like; the data acquisition apparatus is configured to acquire real time images, take photographs, record videos, and store the photographs and videos, and includes an automatic analysis module, which can automatically analyze impact points in the target paper image acquired from the target to obtain shooting accuracy; the data acquisition apparatus may be connected with the server or the mobile terminal; the intelligent target is connected with the server, and can replace the target paper automatically according to an instruction from the server; the server comprises a data server and a streaming media server, wherein the data server manages shooting data, basic data and competition data, and also carries out instruction interaction with the data acquisition apparatus, the intelligent target and the mobile terminal; the streaming media server manages photographs, videos and real time video streams, and cooperates with the data server to respond to user operations.

1, Data Acquisition Apparatus

The data acquisition apparatus performs projection imaging on a target (target paper) by means of an optical imaging principle, optical data is converted into calculable electronic data by a built-in electro-optical conversion unit, shooting results are calculated by means of analysis, the data acquisition apparatus and the mobile terminal as well as a high-definition display screen are linked, so that image data and an analysis result are displayed in real time; and meanwhile the data acquisition apparatus and the data server are linked, so that data about the shooting results is uploaded to the server for storage and further analysis and processing.

The data acquisition apparatus of the present invention has an automatic analysis module, which uses an automatic image analysis method to analyze the shooting accuracies.

Figure 14:
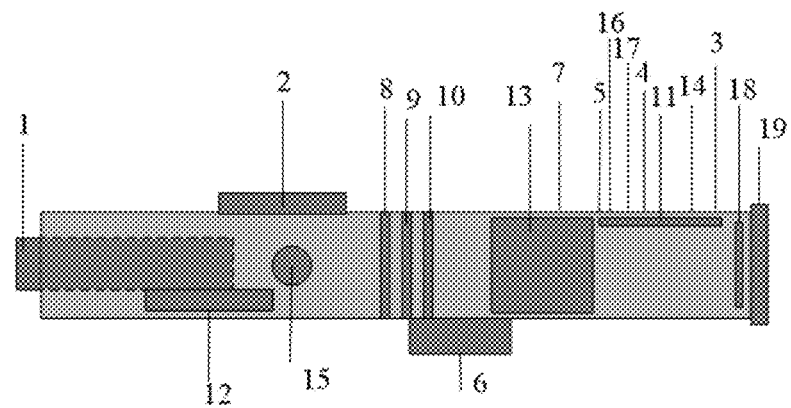
FIG. 14 is a schematic diagram showing a structure of the data acquisition apparatus in an embodiment 1 according to the present invention.

The function of the data acquisition apparatus in the integrated shooting management system based on streaming media is as shown in FIG. 13, and its structure is as shown in FIG. 14.

The data acquisition apparatus may be conveniently mounted on a fixed tripod or picatinny. The data acquisition apparatus includes an exterior structure, wherein the exterior structure is a detachable structure body as a whole, an internal portion of the exterior structure is an accommodating space with a fixed component, and the accommodating space with the fixed component includes a field of view acquisition unit, electro-optical conversion, a CPU processing unit, an electric zooming assembly, a power supply and a wireless transmission unit.

The field of view acquisition unit 1 includes an objective lens combination or other optical visual device, and the objective lens combination or the optical visual device is mounted on the front end of the field of view acquisition unit 1 to acquire field of view information.

The data acquisition apparatus is a digitallizer as a whole, which may communicate with a smart phone, an intelligent terminal, a sighting apparatus or a circuit and sends video information acquired by the field of view acquisition unit 1 to the smart phone, the intelligent terminal, the sighting apparatus or the circuit, and the information of the field of view acquisition unit 1 is displayed by the smart phone, the intelligent terminal or the like. The field of view information in the field of view acquisition unit 1 is converted by the electro-optical conversion circuit to obtain video information available for electronic display. The circuit includes an electro-optical conversion board 8 which converts a field of view optical signal into an electrical signal, the electro-optical conversion board 8 is located at the rear end in the field of view acquisition unit 1, the electro-optical conversion board 8 converts the optical signal into the electrical signal, while performing automatic exposure, automatic white balance, noise reduction and sharpening operation on the signal, so that the signal quality is improved, and high-quality data is provided for imaging.

The rear end of the electro-optical conversion circuit is connected with a CPU core board 9, and the rear end of the CPU core board 9 is connected with an interface board 10, particularly, the CPU core board 9 is connected with a serial port of the interface board 10 through a serial port, the CPU core board 9 is disposed between the interface board 10 and the electro-optical conversion plate 8, the three components are placed in parallel, and board surfaces are all perpendicular to the field of view acquisition unit 1, and the electro-optical conversion plate 8 transmits the converted video signal to the CPU core board 9 for further processing through a parallel data interface, and the interface board 10 communicates with the CPU core board 9 through a serial port to transmit peripheral operation information such as battery power, time, WIFI signal strength, key operation and knob operation to the CPU core board 9 for further processing.

The CPU core board 9 may be connected with a memory card through the interface board 10. In the embodiment of the present invention, with the field of view acquisition unit 1 as an observation entrance direction, a memory card slot is disposed at the left side of the CPU core board 9, the memory card is inserted in the memory card slot, information may be stored in the memory card, and the memory card may automatically upgrade a software program built in the system.

With the field of view acquisition unit 1 as the observation entrance direction, a USB interface is disposed on a side of the memory card slot on the left side of the CPU core board 9, and by means of the USB interface, the system may be powered by an external power supply or information of the CPU core board 9 is output.

With the field of view acquisition unit 1 as the observation entrance direction, an HDMI interface is disposed on a side of the USB interface at the side of the memory card slot on the left side of the CPU core board 9, and real time video information may be transmitted to a high-definition display device of the HDMI interface through the HDMI interface for display.

A housing is internally provided with a battery compartment 7, a battery pack 13 is disposed within the battery compartment, an elastic sheet is disposed within the battery compartment 7 for fastening the battery pack 13, the battery compartment 7 is disposed in the middle in the housing, and a cover of the battery compartment may be opened by the side of the housing to realize replacement of the battery pack 13.

A line welding contact is disposed at the bottom side of the battery compartment 7, the contact is connected with the elastic sheet inside the battery compartment, the contact of the battery compartment 7 is welded with a wire with a wiring terminal, and is connected with the interface board 10 for powering the interface board 10, the CPU core board 9, the electro-optical conversion board 8, the function operation board 11, the electric zooming assembly 12.

The electric zooming assembly 12 is a stepping motor control unit, wherein the stepping motor control unit is connected with an interface board 10, thereby communicating with a CPU core board 9; and the CPU core board sends a control instruction to the zooming assembly 12 for controlling the zooming.

An external key 3 is disposed at the top of the housing, and connected onto the interface board 10 through the function operation board 11 on the inner side of the housing, and functions of turning the device on or off, photographing and video-recording may be realized by touching and pressing the external key.

A rotary encoder 14 with a key function is disposed on one side, which is close to the external key 3, on the top of the housing, and the rotary encoder 14 is connected with the function operation board 11 inside the housing. The rotary encoder controls functions such as function switching, magnification data adjustment, information setting, operation derivation and transmission.

A Wifi transmission interface antenna 4 is disposed at a position, which is close to the rotary encoder 14, on the top of the housing, the Wifi transmission interface antenna is connected with the function operation board 11 inside the housing, and the function operation board has a Wifi transmission processing circuit which is responsible for transmitting an instruction and data transmitted by the CPU core board as well as receiving instructions transmitted by networking devices such as an external mobile terminal.

A Bluetooth interface antenna 5 is disposed at a position, which is close to the Wifi transmission interface antenna 4, on the top of the housing, the Bluetooth interface transmission interface antenna is connected with the function operation board 11 inside the housing, and the function operation board 11 has a Bluetooth transmission processing circuit which is responsible for transmitting an instruction and data transmitted by the CPU core board as well as receiving instructions transmitted by networking devices such as an external mobile terminal.

A 4G/5G interface antenna 16 is provided at the top of the shell near a Bluetooth interface antenna 5, and is connected with a function operation board 11 inside the shell; the function operation board 11 is provided with a 4G/5G transmission processing circuit, which is responsible for transmitting instructions and data sent by a CPU core board and receiving instructions sent by networked equipment such as an external mobile terminal.

A GPS transmission interface antenna 17 is provided at the top of the shell near a WiFi transmission interface antenna 4, and is connected with a functional operation board 11 inside the shell; the functional operation board 11 is provided with a GPS transmission processing circuit, which is responsible for receiving positioning information and transmitting the positioning information to the CPU core board.

With a viewing field acquisition unit 1 as the observation entrance direction, a display screen 19 is provided on one side of the shell near the function operation board for displaying real time video information and a man-machine interaction operation interface.

A screen switching board 18 is provided on the side of the shell near the display screen 19, and is connected with the function operation board for circuit switching required for normal operation of the screen.

With the field of view acquisition unit 1 as the observation entrance direction, a focusing knob/focusing handwheel 15 is disposed at one side, which is close to the field of view acquisition unit 1, on the right side of the housing, and the focusing knob/focusing handwheel 15 adjusts focusing of the field of view acquisition unit 1 by a spring mechanism, so as to achieve the purpose of clearly observing an object under different distances and different magnifications.

A tripod/picatinny interface 6 is disposed at the bottom of the housing for being fixed on the tripod/picatinny.

An external leather track 2 is disposed at the top of the field of view acquisition unit 1 of the housing, and the external leather track 2 and the field of view acquisition unit 1 are designed with the same optical axis and fastened by screws. The external leather track 2 is designed in a standard size and may be provided with an object fixedly provided with a standard Picatinny connector, and the object includes a laser range finder, a fill light, a laser pen, and the like.

By applying the above data acquisition apparatus, an observer does not need to observe by a monocular eyepiece. Front target surface information is displayed directly in a high-definition liquid crystal display of the data acquisition apparatus in an image video form through the electro-optical conversion circuit. By means of an optical magnification and electronic magnification combination manner, a distant object is displayed in a magnified manner, and the target surface information may be clearly and completely seen through the screen.

By applying the above data acquisition apparatus, without manual data interpretation, through related technologies of image recognition and pattern recognition, old points of impact are automatically filtered, information of newly-added points of impact is reserved, and a specific deviation value and a specific deviation direction of each bullet from a blank at the time of this shooting are automatically calculated; shooting accuracy information may be stored in a database, data in the database may be locally browsed, and shooting within a period of time may be self-evaluated according to data time, the spotting scope system may automatically generate a shooting accuracy trend within a period of time, and provide an intuitive accuracy expression for training in a graph form; and the above text data and the above graph data may be derived locally for being printed so as to be further analyzed and used.

By applying the above data acquisition apparatus, the entire process may be completely recorded in a video manner, and the video record may be used as a sharing video between enthusiasts, the video is uploaded to a video sharing platform via Internet, and the video may be locally placed back for a user to play back the entire shooting and accuracy analyzing process.

By applying the above data acquisition apparatus, it may be linked with a server through the network, the real time location information is uploaded to the server by the data acquisition apparatus, the position of server displays the location of the data acquisition apparatus, the real time video information is uploaded to the server by the data acquisition apparatus, the users operates a client to obtain the video stream for the purpose of live broadcast.

By applying the above data acquisition apparatus, it may be linked with a mobile terminal through the network. With the data acquisition apparatus as a hotspot, the mobile device is connected with the data acquisition apparatus.

By applying the above data acquisition apparatus, it is possible to output real time image data to a high-definition large-size liquid crystal display television or a television wall by wired transmission, so that all people in a certain area can watch on-site at the same time.

2, Mobile Terminal

In the integrated shooting management system based on streaming media, a mobile terminal exists as an important carrier of users interaction, the users can achieve live broadcast, communication, data download and so on via the mobile terminal. A hardware platform of the mobile terminal employs a mature and stable smart phone, an intelligent terminal and a tablet as a carrier, and a dedicated APP is set on the software as a human-computer interaction. The mobile terminal includes the following three operation modes:

(1) Direct Connection with the Data Acquisition Apparatus

Under such a mode, the data acquisition apparatus serves as a wireless WiFi hotspot, and the mobile terminal serves as a client accessed into a WiFi hotspot network, so that the direct connection mode of the mobile terminal with the data acquisition apparatus is achieved. Under the direct connection mode, a transmission distance between the data acquisition apparatus and the mobile terminal is controlled within 100 meters. The mobile terminal is directly connected with an acquisition host, and the mobile terminal displays information of the target paper image in real time, and performs data and instruction interaction with the acquisition host. Its advantages are as follows:

1) the terminal acquires an image and displays it in real time;

2) the terminal controls startup and shutdown of photographing and video recording;

3) the terminal controls the acquisition host to perform zooming, and the acquisition host receives an instruction to control a stepping motor to perform zooming;

4) the terminal configures a channel for WiFi;

5) the terminal controls startup and shutdown of a hotspot function;

6) the terminal controls the acquisition host to start an automatic recognition function; and 7) score data, photographs and video records are downloaded locally.

Figure 15:
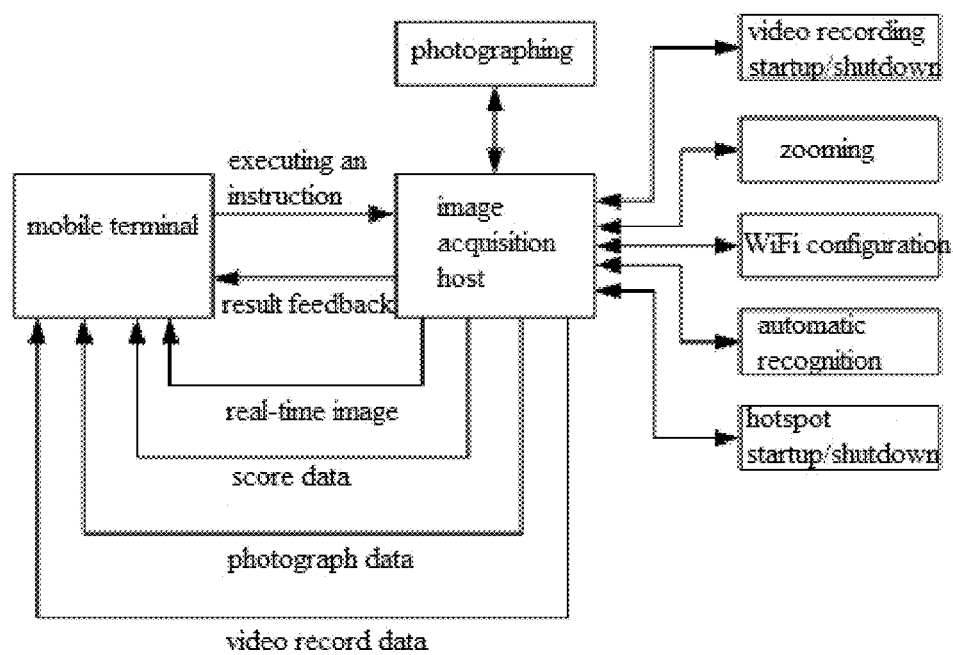
FIG. 15 is a data flow diagram of a direct connection mode between a terminal and an acquisition host.

A data flow diagram of a direct connection mode between the terminal and the acquisition host is shown in FIG. 15.

(2) Interconnection with the Server

Under this mode, the mobile terminal is connected to the server through WiFi or 4G/5G, when the mobile terminal and the server are interconnected, identity registration, login authentication, score information query, live video stream, live communication interaction, video on demand, picture preview, video upload, picture upload, video download, picture download, checking of competition information, checking of shooting patterns and improvement suggestions may be performed, and necessary information such as a user name, a password and an avatar photograph are required to be recorded during the identity registration; the login may be performed in a traditional manner of the user name and the password, quick login may be performed in a face recognition manner as well; and after the login is successful, the score data, photographs and video records local to the mobile terminal may be transmitted to the server. Its advantages are as follows:

1) information registration;

2) login, namely, the user name and password login manner or the face recognition manner;

3) uploading of the score data, photographs and video records;

4) live communication interaction in real time;

5) video on demand, picture preview;

6) checking of competition information, signing up of the competition;

7) directional pushing of product and advertisement;

8) checking of personal scores and a score trend within a period of time;

9) checking of scores of a team to which an individual belongs and a score trend of the team within a period of time;

10) checking of personal shooting patterns and getting of personal shooting suggestion offered by system.

Figure 16:
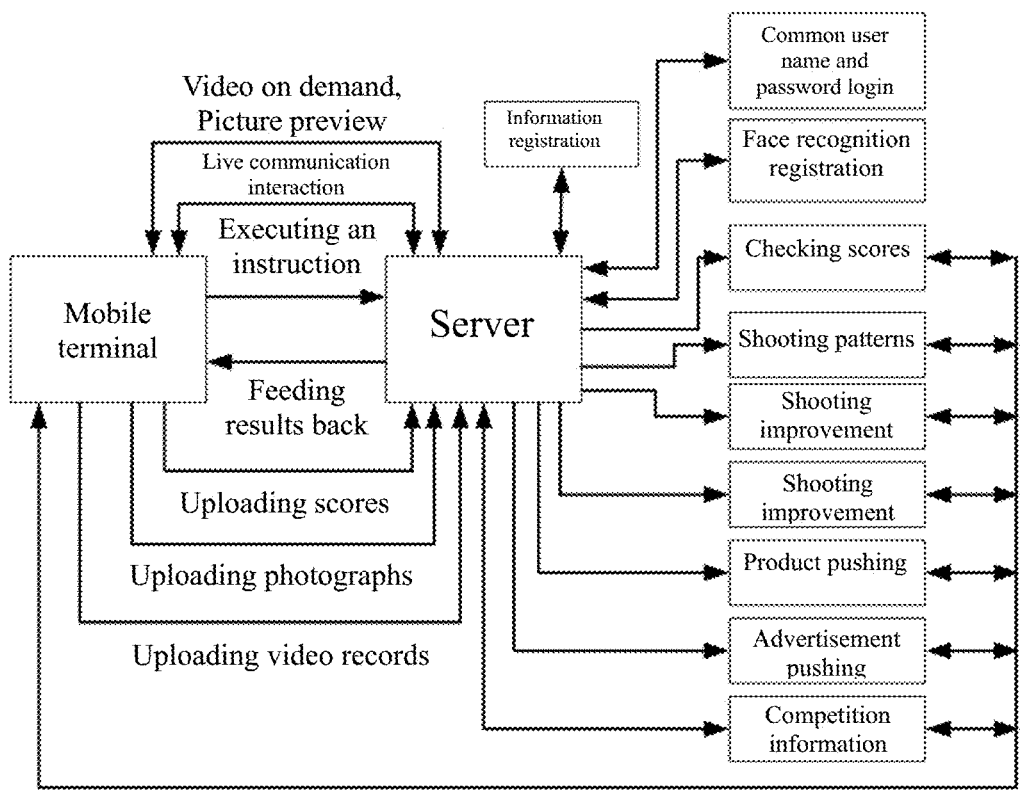
FIG. 16 is a data flow diagram of an interconnection mode between a terminal and a server.

A data flow diagram of an interconnection mode between the terminal and the server is as shown in FIG. 16.

(3) Control of the Interconnection Mode Between the Acquisition Host and the Server As the data acquisition apparatus does not have a human-computer interaction during operation, its function is executed depending on an instruction of the mobile terminal. Specific steps for implementing this mode are as follows:

1) the mobile terminal notifies the data acquisition apparatus of information of a network to be accessed via Bluetooth or WiFi, when the mobile terminal transmits network information to the data acquisition apparatus via Bluetooth, the data acquisition apparatus may connect to the server via Wifi or 4G/5G mobile network; when the mobile terminal transmits network information to the data acquisition apparatus via Wifi, the data acquisition apparatus may also connect to the server via Wifi or 4G/5G mobile network, which different from the Bluetooth transmission method is when the data acquisition apparatus receives the instruction of connecting to the server via Wifi, the data acquisition apparatus need to disconnect the Wifi connection itself first and set the Wifi hotspot mode to the client connection mode, then use the received Wifi connection information to connect to the server;

2) the data acquisition apparatus analyzes instruction data after receiving it, so as to obtain address information of the server which will be connected, the instruction include necessary information such as a name of the network to be accessed, a user name and a password if the server is connected via Wifi;

3) the data acquisition apparatus performs a network access function and feeds a network connection result back to the mobile terminal via Bluetooth or WiFi;

4) the mobile terminal analyzes and determines whether the data acquisition apparatus is successfully accessed or not; and after the data acquisition apparatus is successfully accessed, the mobile terminal may operate to upload the score data, photographs and video records in the acquisition host to the server.

Figure 17:
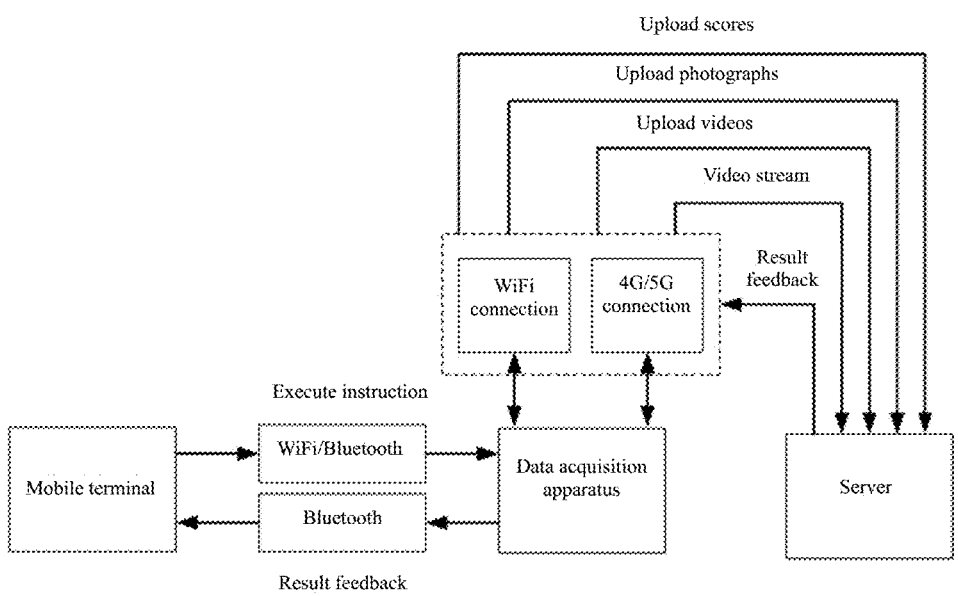
FIG. 17 is a data flow diagram of a mobile terminal in an interconnection mode between an acquisition host and a server.

A data flow diagram of a mobile terminal in an interconnection between an acquisition host and a server is as shown in FIG. 17.

3, Server

Figure 18:
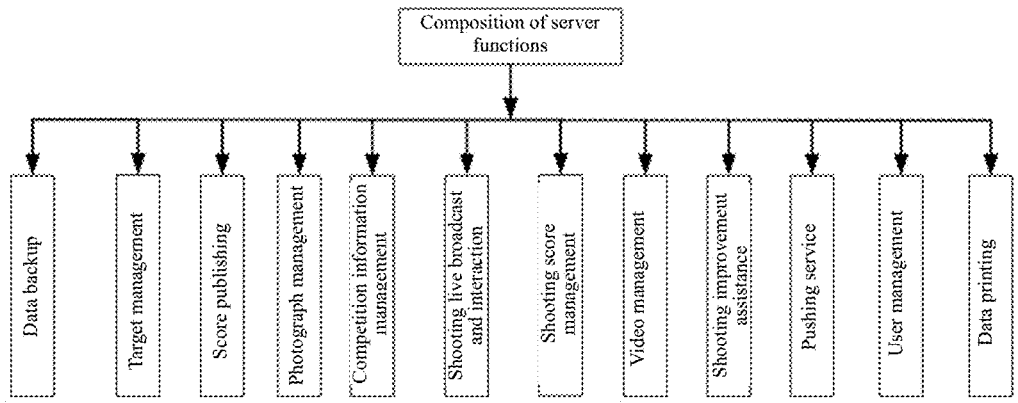
FIG. 18 is a schematic diagram showing a function composition of a server system.

In the integrated shooting management system based on streaming media, the server serves as a final place for steaming media processing, data processing, interaction and storage, and is an important part for achieving shooting integrated management, which mainly includes the following functions: shooting live interaction, shooting score management, pushing service, competition information management, shooting improvement assistance, score publishing, user management, video record management, photograph management, intelligent target management, database backup, etc., the comprising of the functions are as shown in FIG. 18.

(1) Shooting Live Interaction

Figure 19:
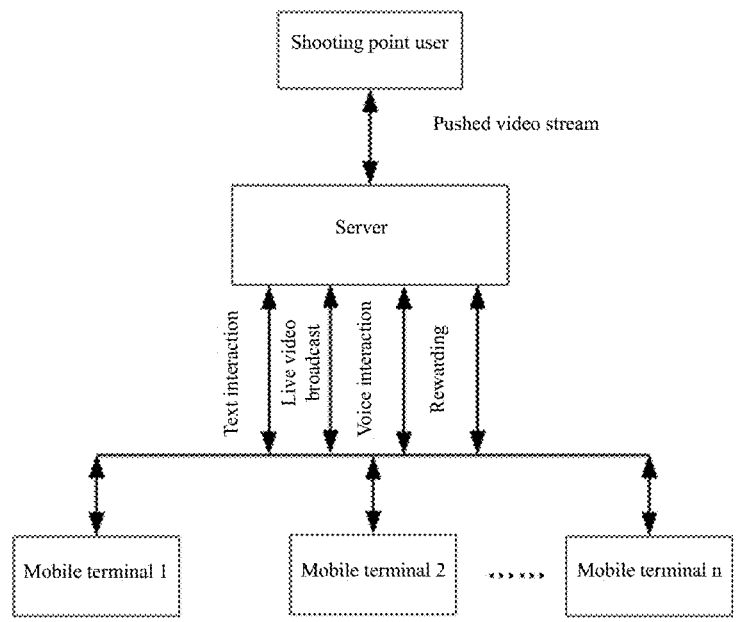
FIG. 19 is a data flow diagram of a shooting live interaction.

The shooting point is connected to the server through WiFi or 4G/5G signals. After the shooting point is successfully connected to the server, the server marks the position of the shooting point on a map according to the access point. The user operates a mobile terminal or PC terminal, selects the shooting point for interaction, and clicks to enter a live interaction page, in which the user may communicate and interact with text and voice while watching the real time shooting screen, and can reward the shooters at the same time. The user may purchase virtual coins or virtual symbols through a payment page on the mobile terminal or PC terminal, wherein different coins or symbols represent different values. The user may express support for a shooter by rewarding, and the shooter may exchange coins in circulation or other currencies that can be circulated normally with the obtained virtual coins or symbols. An interactive data flow diagram of live broadcast of shooting is shown in FIG. 19.

(2) Shooting Score Management

Figure 20:
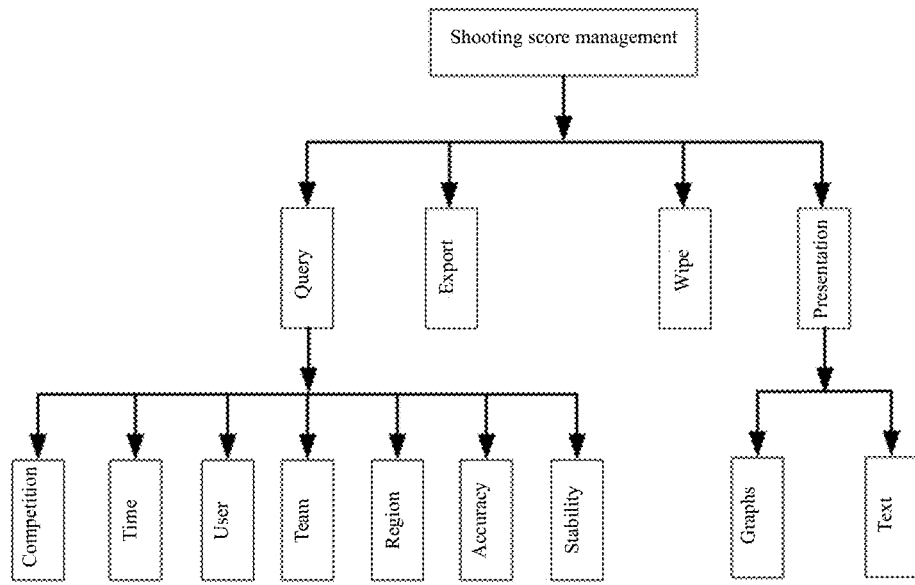
FIG. 20 is a schematic diagram showing a function composition of a shooting score management.

Data query and statistics may be carried out by conditions such as competition, time, user, group, shooting ability, etc., and the trend curve under the condition may be calculated and plotted, wherein the shooting ability includes shooting score, shooting accuracy, and shooting stability, etc.; in addition, queries may also be carried out by region to find out the ranks of scores of shooters in a region. The regions include multiple levels of regions, such as nation, state, city, and shooting range, etc. Data export and wipe operations may be performed for the queried data. The composition of the shooting score management function is shown in FIG. 20.

(3) Photograph Management

The data is managed with the users as a basic unit, batch exporting and deleting operations may be performed, and meanwhile, local previewing may be performed.

(4) Video Record Management

The video record data is managed with the users as a basic unit, batch exporting and deleting operations may be performed, and meanwhile, local previewing may be performed.

(5) Pushing Service

Figure 21:
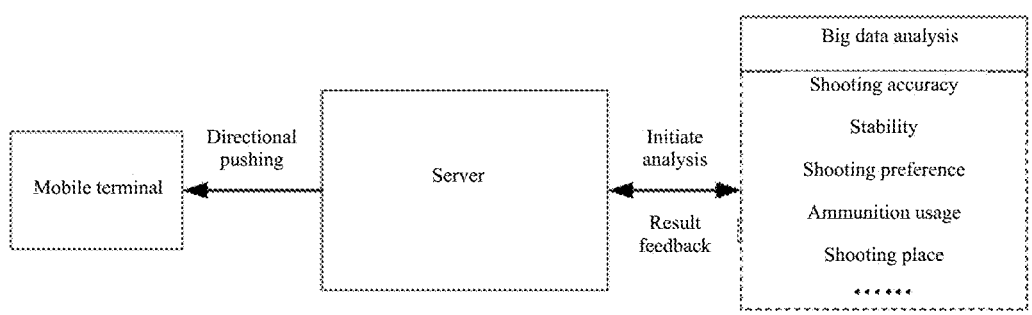
FIG. 21 is a data flow diagram of a pushing service.

The system automatically analyzes the shooting accuracy, stability, shooting preference, shooting location, ammunition usage and other data of each user through big data operation, and pushes products that are helpful for the users to improve their skills in an oriented and targeted manner, and pushes information related with the users' interests, such as market price, trend, etc. of products frequently used by the users. A data flow diagram of pushing service is shown in FIG. 21.

(6) Competition Information Management

Figure 22:
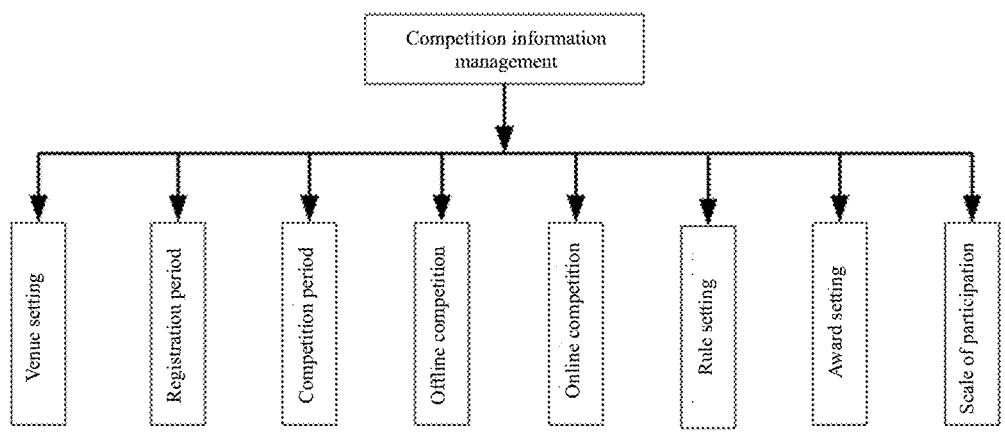
FIG. 22 is a schematic diagram showing a function composition of an competition information management.

The integrated shooting management system based on streaming media introduces a concept of competition to overcome a situation that the shooting fans want to have skill competitions but have no participation platforms or have difficulties in participation. The system makes the competition digitized and intelligentized, and the competition organizers can easily and quickly publish competitions with the competition information management function of the system, and notifications for competitions are pushed to the users. The competition information management comprises formulation of competition process and creation of competition. The formulation of competition process mainly involves formulation of a competition process and other matters by the competition organizer; the creation of competition is the core of competition information management. The competitions include online competition and offline competition. The composition of the competition information management function is shown in FIG. 22.

Online Competition

Figure 23:
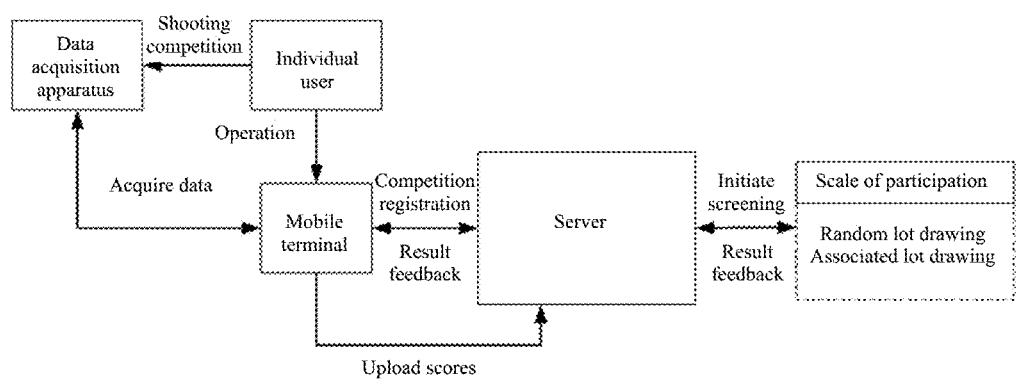
FIG. 23 is a block diagram of a process for online competition.

An online competition means that users register online, and the system screens and confirms the registration according to specific criteria. After the registration is accepted, the competitors may spontaneously find places to shoot in accordance with the regulations of the competition within specified time, and upload the results to the server within the specified time; the server automatically perform statistics and analysis of the results of the competitors and gives appropriate rewards to the competitors according to the results. The online competition process is shown in FIG. 23.

Offline Competition

Figure 24:
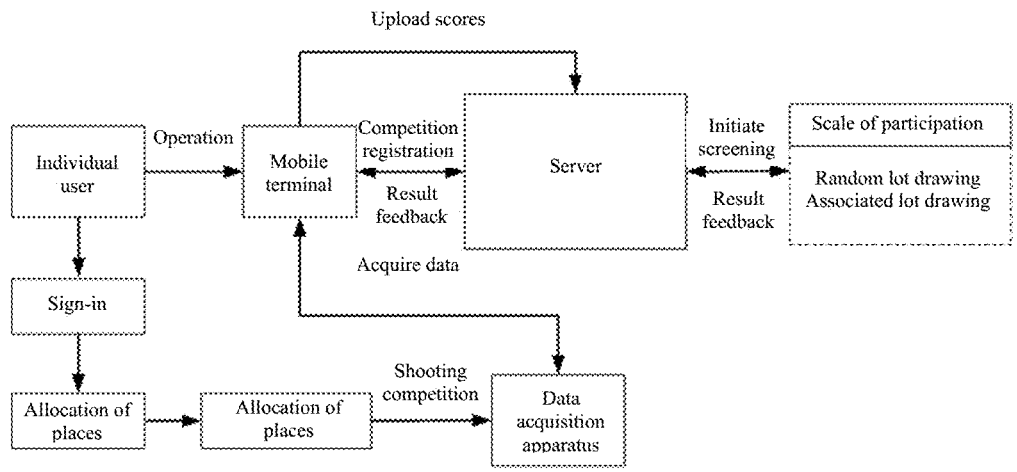
FIG. 24 is a block diagram of a process for offline competition.

An offline competition means that the users must go to the designated competition field within the specified time. The competition field may be a single competition field or multiple competition fields according to the specific competition level. The competition levels include nation, state, city and shooting range levels. The results of competitions at each level will be recorded separately, and only the results of competitions at the same level can be compared with each other. The shooting data in other places except the specified competition fields will not be recorded as the results of the competition. Compared with online competitions, offline competitions are more complex in the execution process, and should further include check-in, allocation of places and arrangement of competition order. The offline competition process is shown in FIG. 24.

Setup of Competition Venues

The competition venues are set up exclusively for offline competitions. Different competition venues may be selected according to the level of the offline competition. Different competition venues may be provided with different numbers of competition targets. Only the results obtained from the competition targets are effective results.

Registration Period

A registration period is set up, and the registration information will be registered by the system only if the registration process is completed within the registration period.

Competition Period

The competition period is the time from the start of registration to the end of the competition. Online competitions are relatively simple in the competition period; offline competitions further include sign-in, allocation of place, and arrangement of competition order, etc., besides the normal procedures of registration, examination and competition.

Rule Setting

Different rules may be set for different competition forms. For example, for single competitions, a score accumulation rule may be directly set, for team competitions, additional scoring rules may be set in addition to the score accumulation rule for individual team members. Additional points may be added if the average result exceeds a certain threshold; or points may be deducted from the total score pool if the average result is lower than the threshold. Different rules can lead to different types of competitions, so as to enrich the diversity of competitions.

Award Setting

According to the characteristics of each type of competition, incentive measures suitable for the competition may be set up separately, and the awards may be distributed under the competition rules.

Scale of Participation

In order to facilitate the organization of competition and ensure the quality of competition, a limit for the scale of competition is set within a controllable range. A controllable scale of participation not only can ensure successful operation of the competition, but also can improve the quality of the competition and the intensity of competition, thus promoting the development of the competition. If the number of applicants is higher than the preset scale of competition, the system may generate a list of competitors by lot drawing, including random lot drawing and associated lot drawing. The random lot drawing is to randomly select a preset number of applicants from all applicants to form the final list of competitors, while the associated lot drawing is to draw lots under an associated condition. For example, a competence threshold may be set, and only persons with competence above the competence threshold are qualified for lot drawing. The associated conditions may be diversified.

(7) Intelligent Target Management a wireless WiFi module is built in an intelligent target and accessed into a network environment where the server is located through a wireless router, the server monitors a status of the intelligent target online in real time, and detects whether the target is online or online by means of a mode of regularly sending a heartbeat packet; after the intelligent target receives a status detection instruction of the server, it sends online status information to the server; and after the server receives the online status information, a status of the intelligent target is marked as an online status. If the server detects that an instruction may not be sent to the target or the status of the target may not be fed back to the server due to a network failure or target failure, the server determines that the target is in an offline status after a period of time internal. A target area on the server is clicked so that basic information of the target may be checked. When the target is in an online state, the server may remotely control its operation of replacing the target paper; and the server may add, delete and modify a configuration operation of the target.

(8) Data Printing conditionally queried results will be printed and output, wherein the data includes a text and a chart.

(9) Score Ranking Publishing

The users meeting the conditions in a system are displayed according to ranking conditions configured by administration rights as well as a number of ranking lists in real time, and are automatically ranked.

(10) Shooting Improvement Assistance

Through big data analysis, the shooting accuracy, stability, shooting preference and other data of users are obtained. The system automatically formulates methods to improve shooting skills for each user according to the above data, so as to improve the shooting accuracy and skills of the users.

Figure 25:
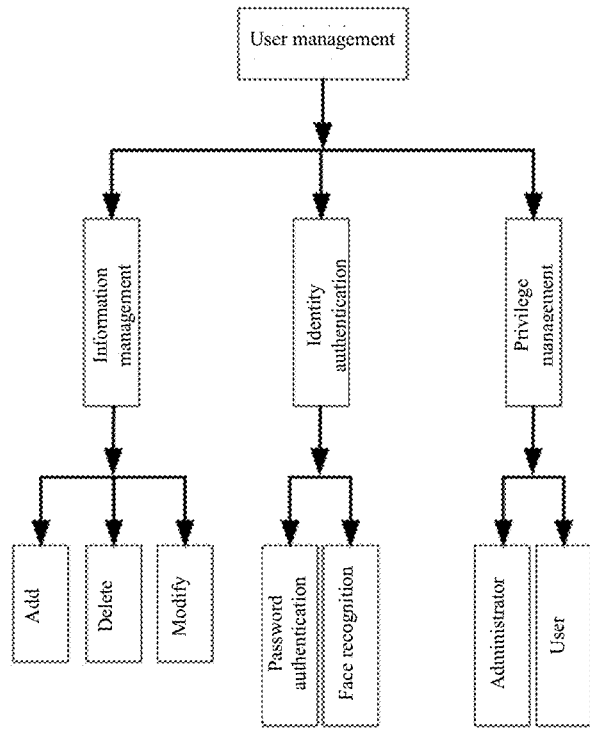
FIG. 25 is a schematic diagram showing a function composition of a user management.

(11) User Management it includes rights management, user information management and identity authentication, wherein the rights management includes ordinary rights management and administrator rights management; during the login with different rights, operable tasks will be automatically matched; the user information management includes user information registration increase, information modification and user deletion; and the identity authentication includes common user name and password authentication and dynamic face recognition authentication. The comprising of the user management function is as shown in FIG. 25.

(12) Database Backup the database backup function is operated under the administrator rights, and the database backup may reduce the server capacity burden while ensuring that the data is safe and restorable.

4, Intelligent Target

Figure 26:
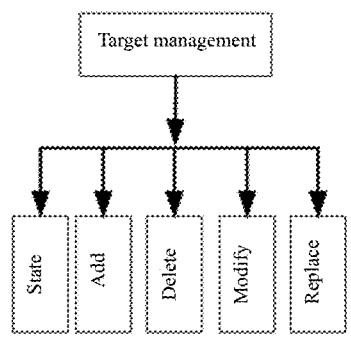
FIG. 26 is a schematic diagram showing a management function of an intelligent target system.
Figure 27:
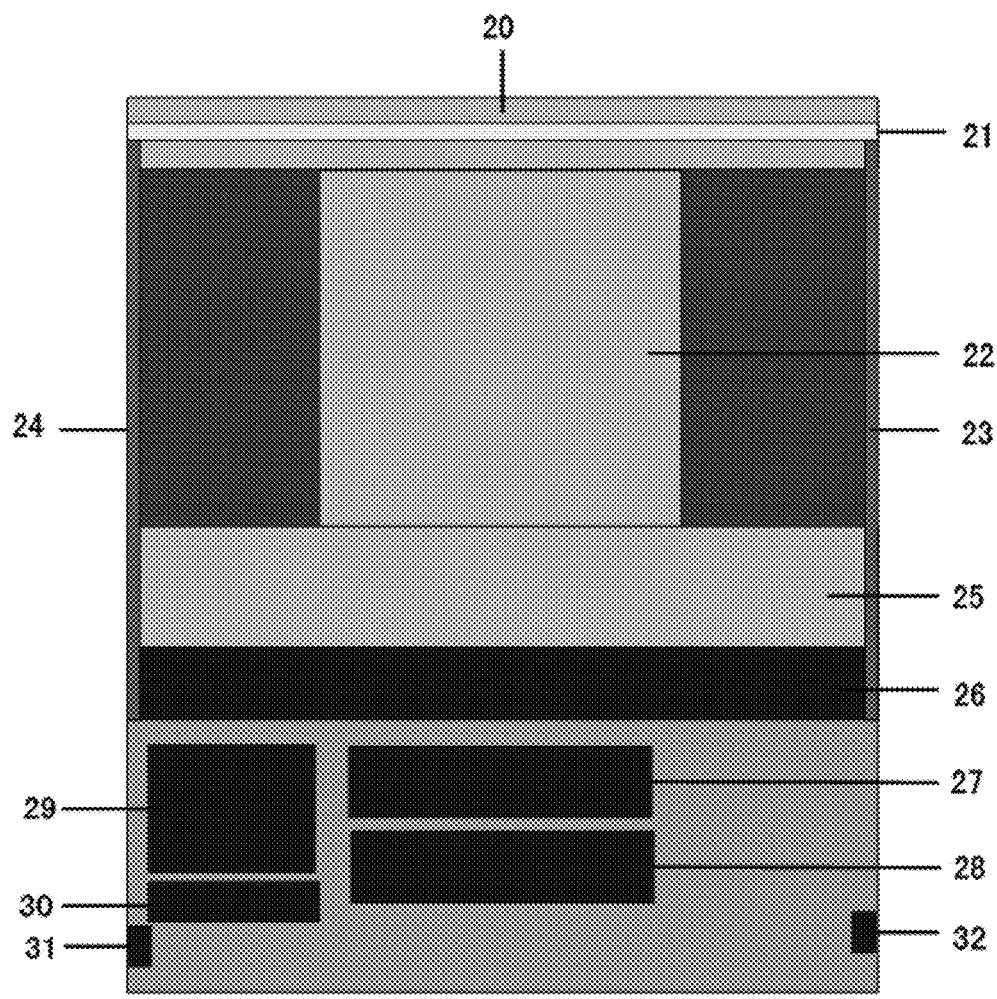
FIG. 27 is a schematic diagram showing a structure of an intelligent target system.

In the shooting training management system, the server remotely controls the intelligent target to replace the target paper through the network, without manual site replacement. The present invention provides an intelligent target for remotely controlling automatic replacement of a target paper, the server with the functions of adding, modifying, deleting or replacing target paper monitors the status of the intelligent target in real time. A function of an intelligent target management is as shown in FIG. 26. A function of an intelligent target system is as shown in FIG. 13, and its structure is as shown in FIG. 27.

The intelligent target is mounted on a flat ground, the intelligent target includes an exterior structure which is a detachable structure as a whole, and an internal portion of the exterior structure is an accommodating space with a fixing component, the accommodating space with the fixing component includes a target paper recovery compartment, a target paper rotary shaft, drive shafts, a target paper area, a new target paper compartment, a motor servo mechanism, a CPU processing unit, a wireless WiFi unit, a transmission antenna, a battery compartment, a power manager and an external power interface.

The target paper recovery chamber 20 is a space area for the motor servo mechanism 26 to control the recovery and the storage of the used target paper.

The target paper rotation shaft 21 is a rotary shaft built in the target paper recovery compartment for storing a recovered target paper roll.

The target paper area is a new target paper hanging area, and the processor controls the motor servo mechanism 26 to suspend a new target paper in this area for shooting.

The first drive shaft 23 and the second drive shaft 24 are used for connecting the motor servo mechanism 26 and the target paper rotary shaft 21 and are action drive components between the motor servo mechanism 26 and the target paper rotary shaft 21 for driving the target paper rotary shaft 21 to rotate.

The new target paper compartment 25 stores unused new target papers.

The motor servo mechanism 26 is used for controlling the replacement of the target paper. The motor servo mechanism 26 is connected with the CPU processing unit 08 through an interface. The CPU processing unit 27 controls an execution of the motor servo mechanism 26 to drive the drive shafts 23 and 24 and the target paper rotary shaft 21 to rotate, so that the replacement of the target paper is achieved.

The CPU processing unit 27 is configured to process information of the instruction of the server, and control an execution action of the motor servo mechanism 26. The CPU processing unit receives the instruction of the server through the wireless WiFi unit 28, performs a control action, and feeds results back to the server.

The wireless WiFi unit 28 is connected with the CPU processing unit 27 and is responsible for receiving information from the server and sending data to the server. The wireless WiFi unit 28 is connected with the transmission antenna 32, so as to achieve signal amplification and increase a transmission distance.

The battery compartment 29 is internally provided with a lithium battery pack as a standby power source for the intelligent target. The battery compartment 29 is connected with the power management unit 30. The power management unit is responsible for supplying a power to the system.

The power management unit 30 is connected with the battery compartment 29, the CPU processing unit 27, the wireless WiFi unit 28, and the external power interface 31 to supply a power to the CPU processing unit 27 and the wireless WiFi unit 28. When an external power supply is used, the power management unit charges the battery pack mounted in the battery compartment 29. When external power supply is disconnected, the power management unit automatically switches to use the battery compartment 29 to supply a power to the system.

The external power interface 31 is a mains output interface.

5, Image Projection Display Screen

The image projection screen may be directly interconnected with the acquisition host through an HDMI, an AV interface and other interfaces by employing a mature and stable large display screen, and the screen only shows projection information.

6, Score Publishing Display Screen

The display screen may employ a display screen an interface of which is the network or the HDMI and the AV interface, the screen may be directly connected with the server through the network when being a network interface, if the screen is not a screen without a network interface, then it is connected with the PC terminal through the HDMI and the AV interface, and the server publishes and displays current real time score ranking data on the screen.

7, PC Terminal

The operation carrier of the integrated shooting management system based on streaming media also supports PC terminal in addition to comprises mobile terminal, in order to facilitate a printing operation of the user and the displaying of a non-network large screen, there is a need for a PC terminal to be connected with the printer and a wired large screen for controlling the displaying.

8, Data Printer

The printer is connected with the PC terminal or the server by employing a network, a parallel port, a USB interface, and the like for data printing.

9, Network Device

The network device comprises a wired router, a wireless router, a switch, a repeater, etc.

The present embodiment further provides an analysis method for automatically analyzing a shooting accuracy. The analysis method includes the following steps.

(1) Electro-optical conversion, namely, converting an optical image obtained by the data acquisition apparatus into an electronic image.

(2) Target paper area extraction, namely, extracting a target paper area from the electronic image.

A target paper area of interest is extracted from a global image, and the interference of complex background environment information is eliminated. The target paper area extraction method is a target detection method based on adaptive threshold segmentation. The detection method is high in speed of determining the threshold, and better in performance for a variety of complex conditions, and guarantees the segmentation quality. The detection method sets t as a segmentation threshold of the foreground and the background by employing an idea of maximizing an interclass variance, wherein a ratio of the number of foreground points to the image is w0, an average gray value is u0; and a ratio of the number of background points to the image is w1, an average gray value is u1, and u is set as the total average gray value of the image, then:

$$u=w0*u0+w1*u1;$$

t is traversed from the minimum gray level value to the maximum gray level value, when a value of t lets a value of g to be maximum, t is an optimal segmentation threshold;

$$g=w0*(u0-u)^2+w1*(u1-u)^2;$$

Figure 4:
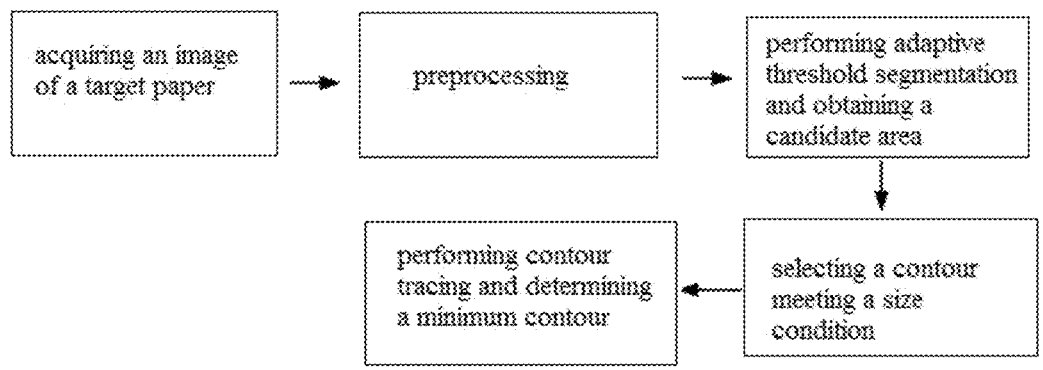
FIG. 4 is a block diagram of a process for extracting a target paper area according to the present invention.

A process for executing the target paper extraction method is as shown in FIG. 4. The target paper extraction method includes four steps, namely, image mean filtering, determination of the segmentation threshold by using an Otsu threshold method, determination of a candidate area by threshold segmentation, determination and truncation of the minimum contour by using a contour tracing algorithm.

(21) Image Mean Filtering.

The image is subjected to large-scale mean filtering to eliminate grid interference on a target paper, highlighting a circular target paper area. By taking a sample with a size 41*41 as an example, a calculation method is as follows:

$$g(x, y) = \frac{1}{41*41}\sum_{i=-20}^{i=20}\sum_{j=-20}^{j=20} \text{origin}\,(x+i, y+j);$$

wherein g(x,y) represents a filtered image, x represents a horizontal coordinate of a center point of a sample on a corresponding point on the image, y represents a longitudinal coordinate of the center point of the sample on the corresponding point on the image, i represents a pixel point horizontal coordinate index value between −20 and 20 relative to x, and j represents a pixel point longitudinal coordinate index value between −20 and 20 relative to y.

(22) Determination of the Segmentation Threshold by Using an Otsu Threshold Method.

Threshold segmentation segments the image into the background and the foreground by using the adaptive Otsu threshold segmentation (OTSU) method according to a gray property of the image. The greater a variance between the background and the foreground is, the greater the difference between the two parts of the image is. Therefore, for the image I(x, y), the segmentation threshold of the foreground and the background is set as Th, a ratio of pixel points belonging to the foreground to the whole image is w2, and its average gray level is G1; a ratio of pixel points belonging to the background to the whole image is w3, and its average gray level is G2, the total average gray level of the image is G_Ave, an interclass variance is g, a size of the image is M*N, in the image, the number of pixels with gray level values smaller than the threshold is denoted as N1, and the number of pixels with gray level values greater than the threshold is denoted as N2, then $$w2 = \frac{N1}{M*N};$$

$$w3 = \frac{N2}{M*N};$$

$$M*N = N1 + N2;$$

$$w2 + w3 = 1;$$

$$G\_Ave = w2*G1 + w3*G2;$$

$$g = w2*(G\_Ave - G1)^2 + w3*(G\_Ave - G2)^2;$$

the resultant equivalence formula is as follows:

$$g=w2*w3*(G1-G2);$$

the segmentation threshold th when the interclass variance g is maximum may be obtained by employing a traversing method.

(23) Segmentation of the Filtered Image in Combination with the Determined Segmentation Threshold th.

$$g(x, y) = \begin{cases} 255, \text{Input}\,(x, y) \geq Th \\ 0, \text{Input}\,(x, y) < Th \end{cases};$$

a binary image segmented into the foreground and the background is obtained.

(24) Determination and Truncation of the Minimum Contour by Employing a Contour Tracing Algorithm.

Contour tracing employs a vector tracing method of a Freeman chain code, which is a method for describing a curve or boundary by using coordinates of a starting point of the curve and direction codes of boundary points. The method is a coded representation method of a boundary, which uses a direction of the boundary as a coding basis. In order to simplify the description of the boundary, a method for describing a boundary point set is employed.

Figure 2:
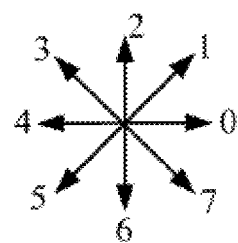
FIG. 2 is a 8-connected chain code in an embodiment 1 according to the present invention.

Commonly used chain codes are divided into a 4-connected chain code and a 8-connected chain code according to the number of adjacent directions of a center pixel point. The 4-connected chain code has four adjacent points, respectively in the upper side, the lower side, the left side and the right side of the center point. The 8-connected chain code increases 4 inclined 45° directions compared with the 4-connected chain code, because there are eight adjacent points around any one pixel, and the 8-connected chain code just coincides with an actual situation of the pixel points, information of the center pixel point and its adjacent points may be accurately described. Accordingly, this algorithm employs the 8-connected chain code, as shown in FIG. 2.

A 8-connected chain code distribution table is as shown in Table 1:

TABLE 1

8-connected chain code distribution table

| 3 | 2 | 1 |
|---|---|---|
| 4 | P | 0 |
| 5 | 6 | 7 |

Figure 3:
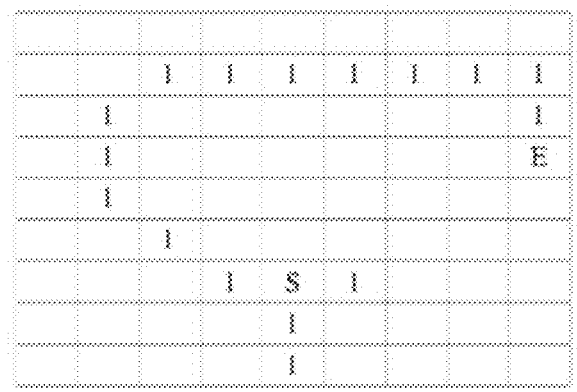
FIG. 3 is a bitmap in an embodiment 1 according to the present invention.

As shown in FIG. 3, a 9×9 bitmap is given, wherein a line segment with a starting point S and an end point E may be represented as L=43322100000066.

A FreemanList structure is customized in combination with a custom structure body:

```
{
int x;
int y;
int type;
FreemanList* next;
}
``` whether the head and the tail of a chain code structure are consistent or not is determined, so that whether the contour is complete or not is determined.

An image of the target paper area is obtained and then stored.

(3) Detecting Points of Impact

The point of impact detection method is a background subtraction-based point of impact detection method. The method includes: detecting points of impact from the image of the target paper area, and determining a position of a center point of each of the points of impact. This method stores the previous target surface pattern, and then uses the current target surface pattern for pixel-level subtraction with the previous target surface pattern. Since images of two frames may have a pixel deviation during the perspective correction calculation of the image, a downsampling method is employed to count an area with 2 pixels as a step length, wherein the area is obtained by calculating the downsampled gray level map with the minimum gray level value as the pixel gray level value within a 2*2 pixel area, with a gray level greater than 0; and this area is subjected to contour detection to obtain information of newly generated points of impact pattern.

The point of impact detection method is high in processing speed when comparison is performed by utilizing pixel-level subtraction of the images of the previous frame and the following frames, and can ensure that positions of the newly generated points of impact are returned.

The point of impact detection method is performed as follows.

(31) Storing an Original Target Paper Image

Data of the original target image is stored and read in a cache to enable the original target image to serve as a reference target paper image. If a target subjected to accuracy calculation is shot again during shooting, the target paper area stored at the time of the last accuracy calculation is used as a reference target paper image.

(32) Performing Pixel-Level Subtraction on the Image Subjected to the Processing of the Steps (1) to (2) and the Original Target Paper Image to Obtain a Difference Position.

The pixel difference threshold of the images of the previous frame and the following frame is set. A setting result is 255 when a pixel difference exceeds the threshold, and the setting result is 0 when the pixel difference is lower than the threshold.

$$\text{result}(x, y) = \begin{cases} 255, \text{grayPre}(x, y)\_\text{grayCur}(x, y) \geq \text{threshold} \\ 0, \text{grayPre}(x, y)\_\text{grayCur}(x, y) < \text{threshold} \end{cases};$$

a specific threshold may be obtained through debugging, with a set range generally between 100 and 160.

(33) Performing Contour Tracing on the Image Generated in the Step (32) to Obtain a Point of Impact Contour and Calculating a Center Point of Each of the Points of Impact.

Contour tracing is performed by a Freeman chain code to calculate an average to obtain the center point of each of the points of impact, and its calculation formula is as follows:

$$Centerx_i = \frac{1}{n} \sum_{i \in FreemanList} FreemanList_i \cdot x;$$

$$Centery_i = \frac{1}{n} \sum_{i \in FreemanList} FreemanList_i \cdot y;$$

$Centerx_i$ represents a center x-axis coordinate of an i-th point of impact, $Centery_i$ represents a center y-axis coordinate of the i-th point of impact, $Freemanlist_i$ represents a contour of the i-th point of impact; and n is a positive integer.

Figure 12:
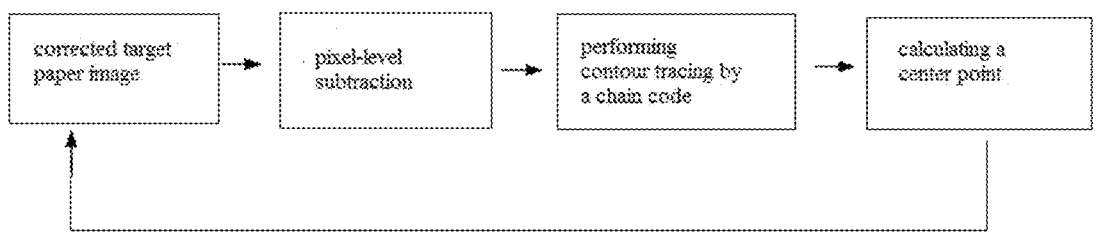
FIG. 12 is a block diagram of a process for performing a point of impact detection method according to the present invention.

A process for performing the point of impact detection method is as shown in FIG. 12.

(4) Calculating a Deviation.

A horizontal deviation and a longitudinal deviation between each of the points of impact and a center of the target paper are detected to obtain a deviation set.

Pixel-level subtraction is performed on the target paper area and the electronic reference target paper to detect the points of impact, and the center point of each of the points of impact is calculated, and the shooting accuracy is determined according to the deviation between the center point of each of the points of impact and the center point of the target paper area.

Embodiment 2

This embodiment is substantially the same as the embodiment 1, with a difference lying in including a target paper area correction step after the target paper area is extracted.

Target Paper Area Correction.

Due to the pasting of the target paper as well as an angular deviation between the spotting scope and the target paper when the image is acquired, an effective area of the extracted target paper may be tilted so that the acquired image is non-circular. In order to ensure that the calculated deviation value of each of the points of impact is higher in accuracy, perspective correction is performed on the target paper image to correct the outer contour of the target paper into a regularly circular contour. The target paper area correction method is a target paper image correction method based on an elliptical end point, and the method obtains the edge of the image by using a Canny operator. Since the target paper image almost occupies the whole image, maximum elliptical contour fitting is performed by using Hough transform in the case of small parameter change range to obtain the maximum elliptic equation. There are cross lines in the target paper image, and a number of points of intersection with the ellipse, and these points of intersection correspond to the uppermost point, the lowermost point, the rightmost point and the leftmost point of the largest circular contour in a standard graph, respectively. Straight line fitting of the cross lines is performed by using Hough transform. In an input sub-image, an intersection point set of the cross lines and the ellipse is obtained, and a perspective transformation matrix is calculated in combination with a point set of the same positions of the template.

The target paper area correction method may quickly obtain an outermost ellipse contour parameter by using the Hough transform. Meanwhile, a Hough transform straight line detection algorithm under polar coordinates can quickly obtain a straight line parameter as well, so that the method can quickly correct the target paper area.

The target paper area correction method is performed as follows.

(51) Performing Edge Detection by Using a Canny Operator.

The method includes five parts of conversion of RGB into a gray level map, Gaussian filtering to suppress noise, first-order derivative calculation of a gradient, non-maximum suppression, detection and connection of the edge by a double-threshold method.

Conversion of RGB into a Gray Level Map

Gray level conversion is performed by a conversion ratio of RGB into a gray level to convert a RGB image into a gray level map (three-primary colors of R, G and B are converted to gray level values), and its process is performed as follows:

Gray=0.299R+0.587G+0.114B

Gaussian Filtering of the Image.

Gaussian filtering is performed on the converted gray level map to suppress noise of the converted image, σ is set as a standard deviation, at this time, a size of the template is set as (3*σ+1)*(3σ+1) according to a Gaussian loss minimization principle, x is set as a horizontal coordinate deviating from the center point of the template, y is set as a longitudinal coordinate deviating from the center point of the template, and K is set as a weight value of a Gaussian filtering template, and its process is performed as follows:

$$K = \frac{1}{2\pi\sigma*\sigma} e^{-\frac{x*x+y*y}{2\sigma*\sigma}}$$

Calculation of a gradient magnitude and a gradient direction by using a finite difference of first-order partial derivative.

A convolution operator:

$$S_x = \begin{bmatrix} -1 & 1 \\ -1 & 1 \end{bmatrix};$$

$$S_y = \begin{bmatrix} 1 & 1 \\ -1 & -1 \end{bmatrix};$$

the gradient is calculated as follows:

$P[i,j]=(f[i,j+1]-f[i,j]+f[i+1,j+1]-f[i+1,j])/2;$ $Q[i,j]=(f[i,j]-f[i+1,j]+f[i,j+1]-f[i+1,j+1])/2;$ $M[i,j]=\sqrt{P[i,j]^2+Q[i,j]^2};$ $\theta[i,j]=\tan^{-1}(Q[i,j]/P[i,j]);$ Non-Maximum Suppression.

The method is to find the local maximum of the pixel point, the gray level value corresponding to a non-maximum point is set to 0, so that most of non-marginal points are eliminated.

Figure 5:
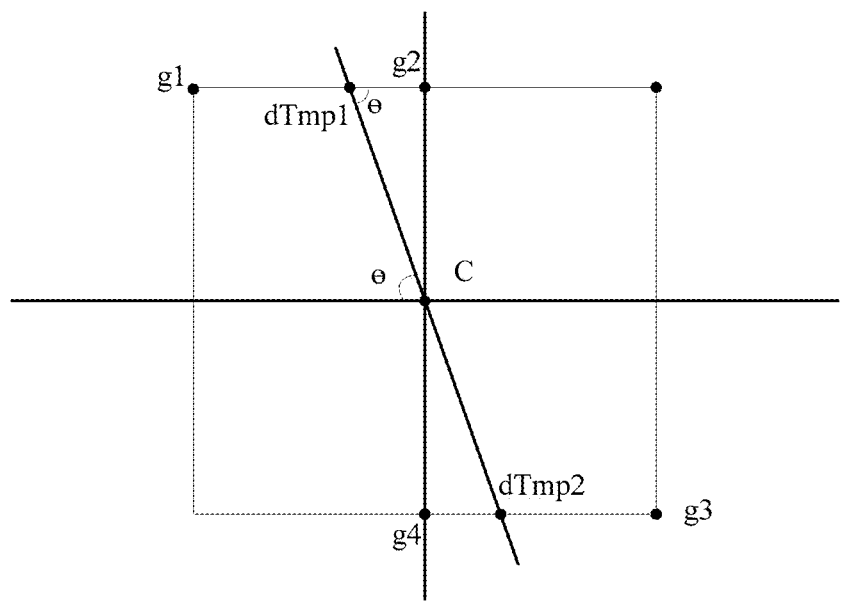
FIG. 5 is a schematic diagram of non-maximum suppression in an embodiment 2 according to the present invention.
Figure 6:
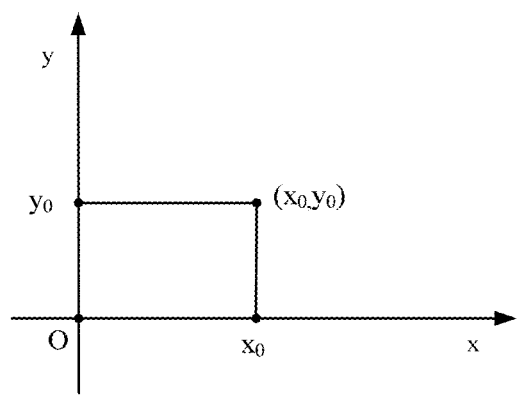
FIG. 6 is a schematic diagram of transformation of an original point under a Caresian coordinate system in an embodiment 2 according to the present invention.

It may be known from FIG. 5, it is necessary to determine whether the gray level value of the pixel point C is maximum within its 8-valued neighborhood when non-maximum suppression is performed. In FIG. 5, a direction of a line $\overline{dTmp1dTmp2}$ in FIG. 5 is a gradient direction of the point C, in this way, it may be determined that its local maximum value is definitely distributed on this line, that is, in addition to the point C, values of the two points of intersection dtmp1 and dTmp2 in the gradient direction will be local maximums. Therefore, determining the gray level value of the point C and the gray level values of these two points may determine whether the point C is a local maximum gray point within its neighborhood. If the gray level value of the point C is less than any of these two points, then the point C is not the local maximum, and it may be excluded that the point C is an edge.

Detection and Connection of the Edge by Adopting a Double-Threshold Algorithm.

A double-threshold method is used to further reduce the number of non-edges. A low threshold parameter Lthreshold and a high threshold parameter Hthreshold are set, and the two constitute a comparison condition, the high threshold and numerical values above the high threshold are converted into 255 values for storage, numerical values between the low threshold and the high value are uniformly converted into 128 values for storage, and other values are considered as non-edge data and replaced by 0.

$$g(x, y) = \begin{cases} 0, & g(x, y) \leq Lthreshold \\ 255, & g(x, y) \geq Hthreshold \\ 128, & Lthreshold < g(x, y) < Hthreshold \end{cases};$$

edge tracing is performed by utilizing the Freeman chain code again to filter out edge points with small length.

(52) Fitting the Cross Lines by Using the Hough Transform Under the Polar Coordinates to Obtain a Linear Equation.

The Hough transform is a method for detecting a simple geometric shape of a straight line and a circle in image processing. One straight line may be represented as y=kx+b by using a Caresian coordinate system, then any one point (x,y) on the straight line is converted into a point in a k-b space, in other words, all non-zero pixels on the straight line in an image space are converted into a point in the k-b parameter space. Accordingly, one local peak point in the parameter space may correspond to one straight line in an original image space. Since a slope has an infinite value or an infinitesimal value, the straight line is detected by using a polar coordinate space. In a polar coordinate system, the straight line can be represented as follows:

$$\rho = x^* \cos \theta + y^* \sin \theta$$

Figure 7:
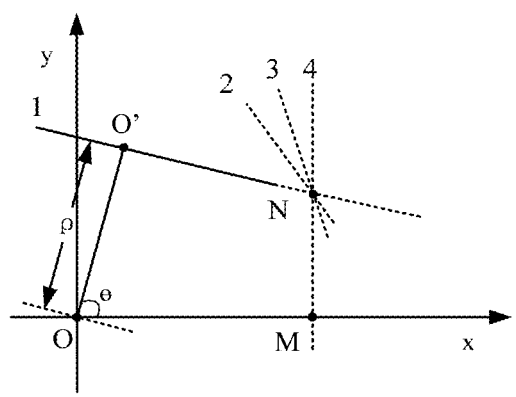
FIG. 7 is a schematic diagram showing any four straight lines passing through an original point under a Caresian coordinate system in an embodiment 2 according to the present invention.
Figure 8:
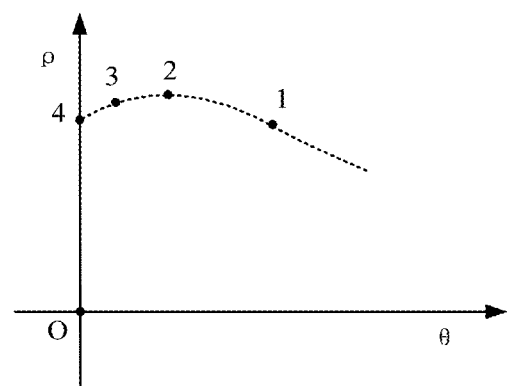
FIG. 8 is a schematic diagram of expression of any four straight lines passing through an original point under a polar coordinate system in a Caresian coordinate system in an embodiment 2 according to the present invention.

It may be known from the above formula in combination with FIG. 7, a parameter ρ represents a distance from an origin of coordinates to the straight line, each set of parameters ρ and θ will uniquely determine one straight line, and only if the local maximum value serves as a search condition in the parameter space, a straight line parameter set corresponding to the local maximum may be acquired.

After the corresponding straight line parameter set is obtained, the non-maximum suppression is used to reserve a parameter of the maximum.

(53) Calculating Four Points of Intersection of the Cross Lines with the Ellipse.

Figure 9:
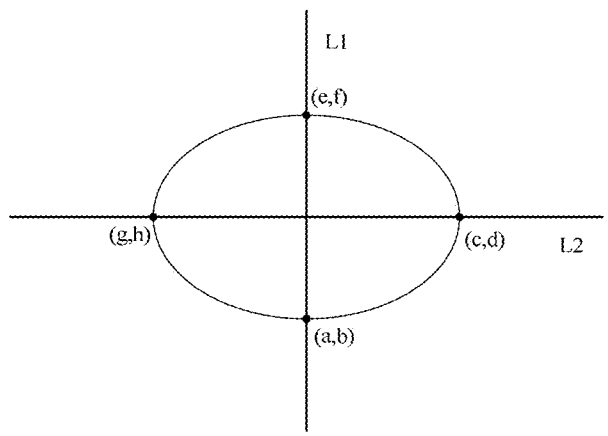
FIG. 9 is a schematic diagram of determining points of intersection of cross lines L1 and L2 with an ellipse in an embodiment 2 according to the present invention.

L1 and L2 linear equations are known, as long as points of intersection with an outer contour of the ellipse are searched in a straight line direction to obtain four intersection point coordinates (a, b), (c, d), (e, f), (g, h), as shown in FIG. 9.

(54) Calculating a Perspective Transformation Matrix Parameter for Image Correction.

The four points of intersection are used to form four point pairs with coordinates of four points defined by the template, and the target paper area is subjected to perspective correction.

Figure 10:
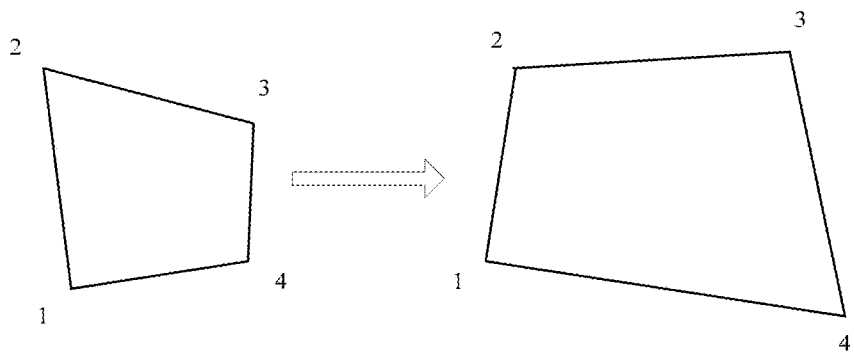
FIG. 10 is a schematic diagram of a perspective transformation diagram in an embodiment 2 according to the present invention.
Figure 11:
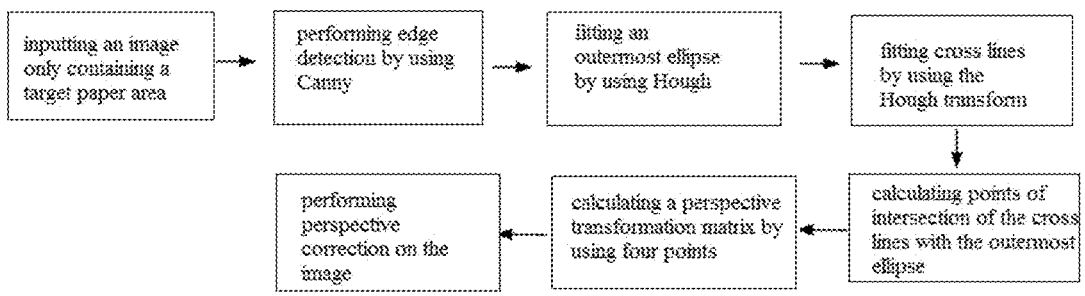
FIG. 11 is a block diagram of a process for performing target paper area correction according to the present invention.

The perspective transformation is to project the image to a new visual plane, and a general transformation formula is as follows:

$$[x', y', w'] = [u, v, w] \begin{bmatrix} a_{11} & a_{12} & a_{13} \\ a_{21} & a_{22} & a_{23} \\ a_{31} & a_{32} & a_{33} \end{bmatrix};$$

u and v are coordinates of an original image, corresponding to coordinates x' and y' of the transformed image. In order to construct a three-dimensional matrix, auxiliary factors w, w' are added, w is taken as 1, and w' is a value of the transformed w, wherein $$x' = x/w;$$

$$y' = y/w;$$

the above formulas may be equivalent to:

$$x' = \frac{x}{w} = \frac{a_{11}*u + a_{12}*v + a_{31}}{a_{13}*u + a_{23}*v + a_{33}};$$

$$y' = \frac{y}{w} = \frac{a_{12}*u + a_{22}*v + a_{32}}{a_{13}*u + a_{23}*v + a_{33}};$$

accordingly, the perspective transformation matrix can be obtained by giving the coordinates of the four points corresponding to the perspective transformation. After the perspective transformation matrix is obtained, the image or the pixel point may be subjected to perspective transformation. As shown in FIG. 10:

in order to facilitate the calculation, we have simplified the above formula, $(a_1, a_2, a_3, a_4, a_5, a_6, a_7, a_8)$ is set as 8 parameters of the perspective transformation, and the above formulas are equivalent to:

$$x' = \frac{a_1*x + a_2*y + a_3}{a_7*x + a_8*y + 1};$$

$$y' = \frac{a_4*x + a_5*y + a_6}{a_7*x + a_8*y + 1};$$

wherein (x, y) represents a to-be-calibrated map coordinate, (x',y') represents a calibrated map coordinate, that is, a template map coordinate. The above formulas are equivalent to:

$$a_1*x + a_2*y + a_3 - a_7*x*x' - a_8*y*x' - x' = 0;$$

$$a_4*x + a_5*y + a_6 - a_7*x*y' - a_8*y*y' - y' = 0;$$

the above formulas are converted into a matrix form:

$$\begin{bmatrix} x & y & 1 & 0 & 0 & 0 & -xx' & -yx' \\ 0 & 0 & 0 & x & y & 1 & -xy' & -yy' \end{bmatrix} \begin{bmatrix} a_1 \\ a_2 \\ a_3 \\ a_4 \\ a_5 \\ a_6 \\ a_7 \\ a_8 \end{bmatrix} = \begin{bmatrix} x' \\ y' \end{bmatrix};$$

since there are 8 parameters, one point has two equation pairs, so that only 4 points can solve the corresponding 8 parameters. $(x_i, y_i)$ is set as a coordinate of a pixel point of a to-be-calibrated image, $(x'_i, y'_i)$ is set as a coordinate of a pixel point of a template map, i={1,2,3,4}. Accordingly, the matrix form may be converted into:

$$\begin{bmatrix} x_1 & y_1 & 1 & 0 & 0 & 0 & -x_1x'_1 & -y_1x'_1 \\ 0 & 0 & 0 & x_1 & y_1 & 1 & -x_1y'_1 & -y_1y'_1 \\ x_2 & y_2 & 1 & 0 & 0 & 0 & -x_2x'_2 & -y_2x'_2 \\ 0 & 0 & 0 & x_2 & y_2 & 1 & -x_2y'_2 & -y_2y'_2 \\ x_3 & y_3 & 1 & 0 & 0 & 0 & -x_3x'_3 & -y_3x'_3 \\ 0 & 0 & 0 & x_3 & y_3 & 1 & -x_3y'_3 & -y_3y'_3 \\ x_4 & y_4 & 1 & 0 & 0 & 0 & -x_4x'_4 & -y_4x'_4 \\ 0 & 0 & 0 & x_4 & y_4 & 1 & -x_4y'_4 & -y_4y'_4 \end{bmatrix} \begin{bmatrix} a_1 \\ a_2 \\ a_3 \\ a_4 \\ a_5 \\ a_6 \\ a_7 \\ a_8 \end{bmatrix} = \begin{bmatrix} x'_1 \\ y'_1 \\ x'_2 \\ y'_2 \\ x'_3 \\ y'_3 \\ x'_4 \\ y'_4 \end{bmatrix}; \text{let}$$

$$A = \begin{bmatrix} x_1 & y_1 & 1 & 0 & 0 & 0 & -x_1x'_1 & -y_1x'_1 \\ 0 & 0 & 0 & x_1 & y_1 & 1 & -x_1y'_1 & -y_1y'_1 \\ x_2 & y_2 & 1 & 0 & 0 & 0 & -x_2x'_2 & -y_2x'_2 \\ 0 & 0 & 0 & x_2 & y_2 & 1 & -x_2y'_2 & -y_2y'_2 \\ x_3 & y_3 & 1 & 0 & 0 & 0 & -x_3x'_3 & -y_3x'_3 \\ 0 & 0 & 0 & x_3 & y_3 & 1 & -x_3y'_3 & -y_3y'_3 \\ x_4 & y_4 & 1 & 0 & 0 & 0 & -x_4x'_4 & -y_4x'_4 \\ 0 & 0 & 0 & x_4 & y_4 & 1 & -x_4y'_4 & -y_4y'_4 \end{bmatrix}$$

$$X = \begin{bmatrix} a_1 \\ a_2 \\ a_3 \\ a_4 \\ a_5 \\ a_6 \\ a_7 \\ a_8 \end{bmatrix}; b = \begin{bmatrix} x'_1 \\ y'_1 \\ x'_2 \\ y'_2 \\ x'_3 \\ y'_3 \\ x'_4 \\ y'_4 \end{bmatrix};$$

the above formula is as follows:

$$AX=b$$

a nonhomogeneous equation is solved to obtain a solution:

$$X=A^{-1}b$$

the corrected target paper area is obtained and then stored, and the image of the corrected target paper area is applied at the time of subsequent ballistic point detection.

The invention claimed is:

1. An integrated shooting management system based on streaming media, comprising a data acquisition apparatus, a mobile terminal, an intelligent target and a server, wherein the mobile terminal is connected with the data acquisition apparatus and/or the server;
   the data acquisition apparatus is configured to acquire real time images, take photographs, and record videos of target paper, and also store the photographs and videos, while the data acquisition apparatus comprises an automatic analysis module, and the automatic analysis module is configured to analyze point of impacts from the target paper image to obtain shooting accuracies;
   the intelligent target is connected with the server, and is configured to add, modify, delete or replace the target paper according to an instruction from the server;
   the server comprises a data server and a streaming media server, wherein the data server manages shooting data, basic data and competition data, and also carries out instruction interaction with the data acquisition apparatus, the intelligent target and the mobile terminal;
   the streaming media server manages photographs, videos and real time video streams, and cooperates with the data server to respond to user operations;
   the mobile terminal controls data exchange with the data acquisition apparatus and/or the server, and invokes and displays the photographs, the video records and the shooting accuracies,
   the mobile terminal includes the following operation modes: direct connection with the data acquisition apparatus, interconnection with the server and control of the interconnection mode between an acquisition host and the server.

2. The integrated shooting management system based on streaming media according to claim 1, wherein the automatic analysis module is configured to convert an optical image captured by the data acquisition apparatus into an electronic image, extract a target paper area from the electronic image, perform pixel-level subtraction on the target paper area and an electronic reference target paper to detect points of impact, calculate a center point of each of the points of impact, and determine the shooting accuracies according to a deviation between the center point of each of the points of impact and a center point of the target paper area;
   the electronic reference target paper is an electronic image of a blank target paper or a target paper area extracted in historical analysis;
   the deviation comprises a longitudinal deviation and a lateral deviation.

3. The integrated shooting management system based on streaming media according to claim 1, wherein the mobile terminal is connected with the data acquisition apparatus as follows: the data acquisition apparatus serves as a wireless WiFi hotspot and the mobile terminal serves as a client to access a WiFi hotspot network, so that a connection between the mobile terminal and the data acquisition apparatus is achieved, and the mobile terminal obtains the photographs acquired by the data acquisition apparatus, raw data of the video records and the shooting accuracies obtained by the data acquisition apparatus;
   a transmission distance between the data acquisition apparatus and the mobile terminal is controlled within 100 meters;
   the mobile terminal displays information of the target paper image acquired by the data acquisition apparatus in real time, controls startup and shutdown of acquisition of the data acquisition apparatus, controls startup of the automatic analysis module of the data acquisition apparatus, and controls startup and shutdown of the WiFi hotspot.

4. The integrated shooting management system based on streaming media according to claim 1, wherein the mobile terminal is connected with the server as follows: the mobile terminal and the server are in the same wireless network to implement the connection between the mobile terminal and the server;
   after the mobile terminal has been verified, the shooting accuracies, the photographs and the video records local to the mobile terminal can be transmitted to the server.

5. The integrated shooting management system based on streaming media according to claim 1, wherein the mobile terminal, the data acquisition apparatus and the server are interconnected particularly as follows:
   1) the mobile terminal notifies the data acquisition apparatus of information of a network to be accessed via Bluetooth or WiFi;
   2) after receiving instruction data, the data acquisition apparatus analyzes the instruction data to obtain a name, a user name and a password of the network to be accessed;
   3) the data acquisition apparatus performs a network access function and feeds a network connection result back to the mobile terminal via Bluetooth or WiFi;
   4) the mobile terminal analyzes and determines whether the data acquisition apparatus is successfully accessed or not, and if the data acquisition apparatus is successfully accessed, the mobile terminal, the data acquisition apparatus and the server are interconnected.

6. The intelligent shooting training management system according to claim 1, wherein the server remotely controls the intelligent target to replace a target paper through a network; the intelligent target has an exterior structure, wherein the exterior structure internally has a target paper recovery compartment, a target paper rotary shaft, drive shafts, a target paper area, a new target paper compartment, a motor servo mechanism, a CPU processing unit and a wireless WiFi unit; and the CPU processing unit receives an instruction of the server through the wireless WiFi unit, the CPU processing unit processes information of the instruction of the server and controls an execution action of the motor servo mechanism, and the motor servo mechanism is connected with the target paper rotary shaft through the drive shafts, the motor servo mechanism drives the drive shafts and the target paper rotary shaft to rotate to realize replacement of the target paper among the new target paper compartment, the target paper area and the target paper recovery compartment.

7. The intelligent shooting training management system according to claim 5, wherein the server further manages the shooting accuracies,
classifies and manages the photographs and the video records in accordance with uploaded users as a basic unit, and
performs data query statistics on the shooting accuracies in accordance with time, user and group conditions, and calculates a trend curve diagram under such conditions.

8. The intelligent shooting training management system according to claim 6, wherein the server further manages the shooting accuracies,
classifies and manages the photographs and the video records in accordance with uploaded users as a basic unit, and
performs data query statistics on the shooting accuracies in accordance with time, user and group conditions, and calculates a trend curve diagram under such condition.

9. The integrated shooting management system based on streaming media according to claim 1, further comprising an image projection display screen, a score publishing display screen, a PC terminal, a data printer, and a network device; the network device comprises a wired router, a wireless router, a switch and a repeater; the video projection display screen is directly interconnected with an acquisition host through an HDMI and an AV interface, and the screen only displays projection information; the interface of the score publishing display screen is a network or the HDMI or the AV interface, the score publishing display screen is directly connected with the server through a network interface or with a PC terminal through the HDMI or the AV interface, the server publishes and displays current real time shooting accuracy ranking data on the score publishing display screen; the data printer is connected with the server by employing a network, a parallel port and a USB interface for data printing; the PC terminal is connected with the data printer and the score publishing display screen to control the printing of the data printer and the displaying of the score publishing display screen.

10. The integrated shooting management system based on streaming media according to claim 1, wherein the data acquisition apparatus comprises an exterior structure, wherein the exterior structure is a detachable structure as a whole, and the exterior structure internally comprises a field of view acquisition unit, an electric zooming assembly, an electro-optical conversion circuit, and a CPU processing unit;
the field of view acquisition unit comprises an objective lens combination; the objective lens combination is mounted on the front end of the field of view acquisition unit to obtain field of view information;
the electro-optical conversion circuit is configured to convert the field of view information into electronic information to displayed by the electronic unit;
the CPU processing unit is connected with the electro-optical conversion circuit and configured to process the electronic information;
the automatic analysis module is configured to analyze the electronic information to obtain shooting accuracies;
the electric zooming assembly is configured to change a focal length of the objective lens combination;
the CPU processing unit is connected with the electric zooming assembly, and the CPU processing unit sends a control instruction to the electric zooming assembly for controlling the zooming.

11. The integrated shooting management system based on streaming media according to claim 2, wherein the automatic analysis module performs perspective correction on the target paper area to correct an outer contour of the target paper area to a circular contour after the target paper area is extracted and further performs point of impact detection by using the target paper area subjected to perspective correction.

12. The integrated shooting management system based on streaming media according to claim 2, wherein extracting a target paper area from the electronic image particularly comprises: performing large-scale mean filtering on the electronic image to eliminate grid interference on the target paper; segmenting the electronic image into a background and a foreground by using an adaptive Otsu threshold segmentation method according to a gray property of the electronic image; and determining a minimum contour by adopting a vector tracing method and a geometric feature of a Freeman link code according to the image segmented into the foreground and background to obtain the target paper area.

13. The integrated shooting management system based on streaming media according to claim 2, wherein performing pixel-level subtraction on the target paper area and an electronic reference target paper to detect points of impact particularly comprises: performing pixel-level subtraction on the target paper area and an electronic reference target paper to obtain a pixel difference image of the target paper area and the electronic reference target paper;
a pixel difference threshold of images of a previous frame and a following frame is set in the pixel difference image, and a setting result is 255 when a pixel difference exceeds the threshold, and the setting result is 0 when the pixel difference is lower than the threshold;
the pixel difference image is subjected to contour tracing to obtain a point of impact contour and a center of the contour is calculated to obtain a center point of each of the points of impact.

14. The integrated shooting management system based on streaming media according to claim 11, wherein the perspective correction particularly comprises: obtaining an edge of the target paper area by using a Canny operator, performing maximum elliptical contour fitting on the edge by using Hough transform to obtain a maximum elliptical equation, and performing straight line fitting of cross lines on the edge by using the Hough transform to obtain points of intersection with an uppermost point, a lowermost point, a rightmost point and a leftmost point of a largest circular contour, and combining the uppermost point, the lowermost point, the rightmost point and the leftmost point of the largest circular contour with four points at the same positions in a perspective transformation template to obtain a perspective transformation matrix by calculation, and performing perspective transformation on the target paper area by using the perspective transformation matrix.

* * * * *